US012692020B2

(12) United States Patent
Dobashi et al.

(10) Patent No.: US 12,692,020 B2
(45) Date of Patent: Jul. 28, 2026

(54) BOARDING BRIDGE REMOTE OPERATION SYSTEM AND BOARDING BRIDGE REMOTE OPERATION PROGRAM

(71) Applicant: SHINMAYWA INDUSTRIES, LTD., Takarazuka (JP)

(72) Inventors: Hideaki Dobashi, Takarazuka (JP); Takeshi Akegami, Takarazuka (JP)

(73) Assignee: SHINMAYWA INDUSTRIES, LTD., Takarazuka (JP)

( * ) Notice: Subject to any disclaimer, the term of this patent is extended or adjusted under 35 U.S.C. 154(b) by 456 days.

(21) Appl. No.: 18/550,673

(22) PCT Filed: Jul. 12, 2021

(86) PCT No.: PCT/JP2021/026168
§ 371 (c)(1),
(2) Date: Sep. 14, 2023

(87) PCT Pub. No.: WO2023/286131
PCT Pub. Date: Jan. 19, 2023

(65) Prior Publication Data
US 2024/0190584 A1 Jun. 13, 2024

(51) Int. Cl.
*B64F 1/305* (2006.01)
*G06V 20/52* (2022.01)
(Continued)

(52) U.S. Cl.
CPC .............. *B64F 1/305* (2013.01); *G06V 20/52* (2022.01); *G06V 40/10* (2022.01); *G08C 17/02* (2013.01)

(58) Field of Classification Search
CPC ........... B64F 1/30; B64F 1/305; B64F 1/3055
(Continued)

(56) References Cited

U.S. PATENT DOCUMENTS

| | | | |
|---|---|---|---|
| 2003/0145403 A1* | 8/2003 | Hutton .................... | B64F 1/305 14/71.5 |
| 2008/0229525 A1* | 9/2008 | Hutton .................... | B64F 1/002 14/71.5 |
| 2018/0354650 A1 | 12/2018 | Tan et al. | |

FOREIGN PATENT DOCUMENTS

| | | | | |
|---|---|---|---|---|
| CA | 2600965 A1 * | 3/2008 | ........... | B64F 1/3055 |
| CN | 112265648 A | 1/2021 | | |

(Continued)

*Primary Examiner* — William V Gilbert
(74) *Attorney, Agent, or Firm* — Alleman Hall LLP

(57) ABSTRACT

A boarding bridge remote operation system of includes image capturing equipment that captures an image ahead of a distal end part of a cab, inside monitoring equipment to monitor inside of a boarding bridge, and a remote controller corresponding to a gate and configured to be communicable with remote equipment. The remote equipment includes an operating unit with which an operator performs an input operation and an information outputter configured to output information inputted thereto. The remote controller gives an operation command corresponding to the input operation to the boarding bridge, obtains image information of the captured image and monitoring information from the inside monitoring equipment, and outputs the obtained image information and the obtained monitoring information to the remote equipment. The operating unit is configured to be operated in a state where a travel device and an area therearound are directly or indirectly visually checkable by the operator.

16 Claims, 10 Drawing Sheets

(51) Int. Cl.
    *G06V 40/10*       (2022.01)
    *G08C 17/02*       (2006.01)
(58) Field of Classification Search
    USPC ........................................................ 14/71.5
    See application file for complete search history.

(56)               References Cited

FOREIGN PATENT DOCUMENTS

| | | | | |
|---|---|---|---|---|
| EP | 2128025 | A2 * | 12/2009 | .............. B64F 1/305 |
| JP | S58188795 | A | 11/1983 | |
| JP | H0311120 | U | 2/1991 | |
| JP | 2005190826 | A | 7/2005 | |
| JP | 2012086731 | A | 5/2012 | |
| JP | 2019526477 | A | 9/2019 | |
| WO | 2018034615 | A1 | 2/2018 | |
| WO | WO-2019229105 | A1 * | 12/2019 | .............. B64F 1/002 |
| WO | WO-2020030704 | A1 * | 2/2020 | ............ B64F 1/3055 |

\* cited by examiner

BOARDING BRIDGE REMOTE OPERATION SYSTEM AND BOARDING BRIDGE REMOTE OPERATION PROGRAM

TECHNICAL FIELD

The present invention relates to a boarding bridge remote operation system and a boarding bridge remote operation program.

BACKGROUND ART

At an airport, a boarding bridge that connects between a terminal building and an aircraft is often used for boarding onto and disembarking from the aircraft.

Patent Literature 1 describes that instructions on automatic operation of a boarding bridge, the automatic operation being controlled by remote centralized control, can be given from a central control room. Patent Literature 1 also describes that the boarding bridge is provided with three monitoring cameras that capture images of the outside of the boarding bridge, and in the central control room, the images taken by the monitoring cameras can be monitored by showing them on a television monitor.

Patent Literature 2 describes a configuration in which a remote-control operating panel is suspended from a maneuvering apparatus provided in a distal-end round room of a boarding bridge, and the remote-control operating panel can be operated from the ground.

CITATION LIST

Patent Literature

PTL 1: Japanese Laid-Open Patent Application Publication No. S58-188795
PTL 2: Japanese Examined Utility Model Application Publication No. H03-11120

SUMMARY OF INVENTION

Technical Problem

In the case of the above-described configuration of Patent Literature 1, when an operator in the central control room gives an instruction on the automatic operation of the boarding bridge, the operator can check whether or not a person, such as a worker, is present outside the boarding bridge by looking at an image shown on the television monitor, the image being taken by the monitoring camera that is provided under the rotunda. In the case of the above-described configuration of Patent Literature 2, since an operator operates the remote-control operating panel on the ground, the operator can check by visual observation whether or not a person, such as a worker, is present outside the boarding bridge.

In both of the above-described cases of Patent Literatures 1 and 2, at the time of remotely operating the boarding bridge, whether or not a person is present outside the boarding bridge can be checked, and thereby coordination with persons outside the boarding bridge can be secured. However, in both of the above-described cases of Patent Literatures 1 and 2, checking whether or not a person is present inside the boarding bridge is not performed.

The present invention has been made to solve the above-described problems. An object of the present invention is to provide a boarding bridge remote operation system and a boarding bridge remote operation program that make it possible to perform remote operation of a boarding bridge in improved coordination with persons.

Solution to Problem

In order to achieve the above object, a boarding bridge remote operation system according to one aspect of the present invention is a remote operation system for performing remote operation of a boarding bridge. The boarding bridge includes: a rotunda connected to a gate of a terminal building; a tunnel unit whose proximal end is connected to the rotunda, the tunnel unit being configured to be extendable and retractable in a longitudinal direction of the tunnel unit; a cab provided at a distal end of the tunnel unit, the cab including a distal end part to be docked with an entrance of an aircraft; a lifting/lowering device that is mounted to the tunnel unit or the cab and that lifts and lowers the tunnel unit and the cab; and a travel device that is mounted under the lifting/lowering device and that travels on a ground. The boarding bridge remote operation system includes: first image capturing equipment that is provided on the cab and that captures an image ahead of the distal end part of the cab; inside monitoring equipment to monitor whether or not a person is present inside the boarding bridge; and a remote controller provided corresponding to the gate and configured to be communicable with remote equipment, the remote equipment including an operating unit with which an operator performs an input operation of inputting an operation command for the boarding bridge and an information outputter configured to output information inputted thereto, wherein the remote controller gives an operation command corresponding to the input operation performed with the operating unit of the remote equipment to the boarding bridge to perform remote control of the boarding bridge, obtains image information of the image captured by the first image capturing equipment and monitoring information of monitoring by the inside monitoring equipment, and outputs the obtained image information and the obtained monitoring information to the remote equipment. The operating unit of the remote equipment is configured to be operated by the operator in a state where the travel device and an area therearound are directly or indirectly visually checkable by the operator.

According to this configuration, the remote operation of the boarding bridge is performed in a state where the operator can visually check directly or indirectly the travel device and the area therearound. This configuration makes it possible to check whether or not a person that may cause inconvenience for (i.e., that may interfere with) the operation of the boarding bridge 1 is present outside the boarding bridge, and thereby coordination with persons outside the boarding bridge can be secured. Moreover, since the monitoring information of the monitoring by the inside monitoring equipment can be obtained by the remote equipment, whether or not a person is present inside the boarding bridge can be checked, and thereby coordination with persons inside the boarding bridge can be secured. This consequently makes it possible to perform the remote operation of the boarding bridge in improved coordination with persons. Furthermore, the image information of the image captured by the first image capturing equipment, the image showing a part of the aircraft, the part being located forward of the distal end part of the cab, is outputted from the information outputter of the remote equipment. This allows the operator to perform the remote operation of the boarding bridge while looking at the image of the entrance of the aircraft.

The inside monitoring equipment may include second image capturing equipment that captures an image of an inside of the boarding bridge, and image information of the image captured by the second image capturing equipment may be the monitoring information.

According to this configuration, the image information of the image captured by the second image capturing equipment, the image showing the inside of the boarding bridge, is outputted from the information outputter of the remote equipment. This allows the operator to perform the remote operation of the boarding bridge while monitoring, for example, whether or not a person is present inside the boarding bridge.

The inside monitoring equipment may include a sensor to detect whether or not a person is present in a predetermined area inside the boarding bridge, and a result of detection by the sensor may be the monitoring information.

According to this configuration, the result of the detection by the sensor is outputted from the information outputter of the remote equipment. This allows the operator to perform the remote operation of the boarding bridge while recognizing whether or not a person is present inside the boarding bridge.

The boarding bridge remote operation system may further include a notifier that is provided inside the boarding bridge and that notifies a person inside the boarding bridge of predetermined information about the remote operation of the boarding bridge.

According to this configuration, a person present inside the boarding bridge can be notified of the information that gives a warning or an evacuation advice in relation to the remote operation.

The boarding bridge remote operation system may further include third image capturing equipment that captures an image of the travel device and the area therearound. The remote controller may be configured to obtain image information of the image captured by the third image capturing equipment and to output the obtained image information to the remote equipment.

According to this configuration, the image information of the image captured by the third image capturing equipment, the image showing the travel device and the area therearound, is outputted from the information outputter of the remote equipment. Accordingly, even if the operator is at a location where the operator cannot visually observe the travel device and the area therearound, the operator can still visually check the travel device and the area therearound in an indirect manner. This allows the operator to perform the remote operation of the boarding bridge while monitoring, for example, whether or not a person is present at or around the travel device.

The remote equipment may be disposed under the rotunda.

According to this configuration, the operator can visually observe (visually check directly) the travel device and the area therearound. This allows the operator to perform the remote operation of the boarding bridge while monitoring, for example, whether or not a person is present at or around the travel device. This configuration also allows the operator to monitor the outside of the boarding bridge over a wide range.

The boarding bridge remote operation system may further include an emergency stop switch disposed under the rotunda, the emergency stop switch being a switch to bring the boarding bridge to an emergency stop when the boarding bridge is operating.

According to this configuration, during the remote operation of the boarding bridge, if any abnormality has occurred in, for example, the boarding bridge, the boarding bridge can be brought to an emergency stop by operating the emergency stop switch.

The remote equipment may be a portable communication terminal. For example, a portable communication terminal, such as a commercially available tablet or smartphone, can be used as the remote equipment.

The gate of the terminal building may be a plurality of gates. The operator may operate the operating unit of the remote equipment to select one of the plurality of gates. The remote controller corresponding to the selected gate and the remote equipment may be configured to communicate with each other.

According to this configuration, for example, the operator in a central monitoring room in the terminal building can operate the remote equipment to select a desired gate and to perform remote operation of the boarding bridge that is connected to the selected gate.

A boarding bridge remote operation program according to one aspect of the present invention is a boarding bridge remote operation program installed on a portable communication terminal, the portable communication terminal including an operating unit with which to perform an input operation and an information outputter configured to output information, the boarding bridge remote operation program causing the portable communication terminal to communicate with a remote controller configured to perform remote control of a boarding bridge. The boarding bridge includes: a rotunda connected to a gate of a terminal building; a tunnel unit whose proximal end is connected to the rotunda, the tunnel unit being configured to be extendable and retractable in a longitudinal direction of the tunnel unit; a cab provided at a distal end of the tunnel unit, the cab including a distal end part to be docked with an entrance of an aircraft; a lifting/lowering device that is mounted to the tunnel unit or the cab and that lifts and lowers the tunnel unit and the cab; a travel device that is mounted under the lifting/lowering device and that travels on a ground; first image capturing equipment that is provided on the cab and that captures an image ahead of the distal end part of the cab; and inside monitoring equipment to monitor whether or not a person is present inside the boarding bridge. The remote controller is configured to obtain image information of the image captured by the first image capturing equipment and monitoring information of monitoring by the inside monitoring equipment. The boarding bridge remote operation program causes the portable communication terminal to perform: a process of causing a display included in the information outputter to display an operation screen with which to perform remote operation of the boarding bridge; a process of, when an operator has performed an input operation of inputting an operation command for the boarding bridge by operating the operating unit on the operation screen displayed by the display, transmitting a signal corresponding to the input operation to the remote controller; and a process of causing the information outputter to output the image information of the image captured by the first image capturing equipment and the monitoring information of the monitoring by the inside monitoring equipment, the image information and the monitoring information being received from the remote controller.

By installing the remote operation program on the portable communication terminal, which is, for example, a commercially available tablet or smartphone, the remote operation of the boarding bridge can be performed by using the portable communication terminal.

A boarding bridge remote operation program according to another aspect of the present invention is a boarding bridge remote operation program stored in a server that communicates with a portable communication terminal and a remote controller, the portable communication terminal including an operating unit with which to perform an input operation and an information outputter configured to output information, the remote controller being configured to perform remote control of a boarding bridge. The boarding bridge includes: a rotunda connected to a gate of a terminal building; a tunnel unit whose proximal end is connected to the rotunda, the tunnel unit being configured to be extendable and retractable in a longitudinal direction of the tunnel unit; a cab provided at a distal end of the tunnel unit, the cab including a distal end part to be docked with an entrance of an aircraft; a lifting/lowering device that is mounted to the tunnel unit or the cab and that lifts and lowers the tunnel unit and the cab; a travel device that is mounted under the lifting/lowering device and that travels on a ground; first image capturing equipment that is provided on the cab and that captures an image ahead of the distal end part of the cab; and inside monitoring equipment to monitor whether or not a person is present inside the boarding bridge. The remote controller is configured to obtain image information of the image captured by the first image capturing equipment and monitoring information of monitoring by the inside monitoring equipment. The boarding bridge remote operation program causes the server to perform: a process of transmitting, to the portable communication terminal, information for causing a display included in the information outputter of the portable communication terminal to display an operation screen with which to perform remote operation of the boarding bridge; a process of, when an operator has performed an input operation of inputting an operation command for the boarding bridge by operating the operating unit on the operation screen displayed by the display, receiving a signal corresponding to the input operation from the portable communication terminal and transmitting the received signal corresponding to the input operation to the remote controller; and a process of transmitting the image information of the image captured by the first image capturing equipment and the monitoring information of the monitoring by the inside monitoring equipment, the image information and the monitoring information being received from the remote controller, to the portable communication terminal.

According to this configuration, for example, a website that is provided by the server and that is intended for the remote operation of the boarding bridge can be accessed and the remote operation of the boarding bridge can be performed by using the portable communication terminal, which is, for example, a commercially available tablet or smartphone.

A boarding bridge remote operation program according to yet another aspect of the present invention is a boarding bridge remote operation program stored in a remote controller, the remote controller being configured to communicate with a portable communication terminal and to perform remote control of a boarding bridge, the portable communication terminal including an operating unit with which to perform an input operation and an information outputter configured to output information. The boarding bridge includes: a rotunda connected to a gate of a terminal building; a tunnel unit whose proximal end is connected to the rotunda, the tunnel unit being configured to be extendable and retractable in a longitudinal direction of the tunnel unit; a cab provided at a distal end of the tunnel unit, the cab including a distal end part to be docked with an entrance of an aircraft; a lifting/lowering device that is mounted to the tunnel unit or the cab and that lifts and lowers the tunnel unit and the cab; a travel device that is mounted under the lifting/lowering device and that travels on a ground; first image capturing equipment that is provided on the cab and that captures an image ahead of the distal end part of the cab; and inside monitoring equipment to monitor whether or not a person is present inside the boarding bridge. The remote controller is configured to obtain image information of the image captured by the first image capturing equipment and monitoring information of monitoring by the inside monitoring equipment. The boarding bridge remote operation program causes the remote controller to perform: a process of transmitting, to the portable communication terminal, information for causing a display included in the information outputter of the portable communication terminal to display an operation screen with which to perform remote operation of the boarding bridge; a process of, when an operator has performed an input operation of inputting an operation command for the boarding bridge by operating the operating unit on the operation screen displayed by the display, receiving a signal corresponding to the input operation from the portable communication terminal; and a process of transmitting the image information of the image captured by the first image capturing equipment and the monitoring information of the monitoring by the inside monitoring equipment to the portable communication terminal.

According to this configuration, the remote controller can be accessed from the portable communication terminal, which is, for example, a commercially available tablet or smartphone, and thereby the remote operation of the boarding bridge can be performed.

Advantageous Effects of Invention

The present invention is configured as described above, and has an advantage of being able to provide a boarding bridge remote operation system that makes it possible to perform remote operation of a boarding bridge in improved coordination with persons.

The above and other objects, features, and advantages of the present invention will more fully be apparent from the following detailed description of preferred embodiments with accompanying drawings.

DESCRIPTION OF EMBODIMENTS

Figure 1:
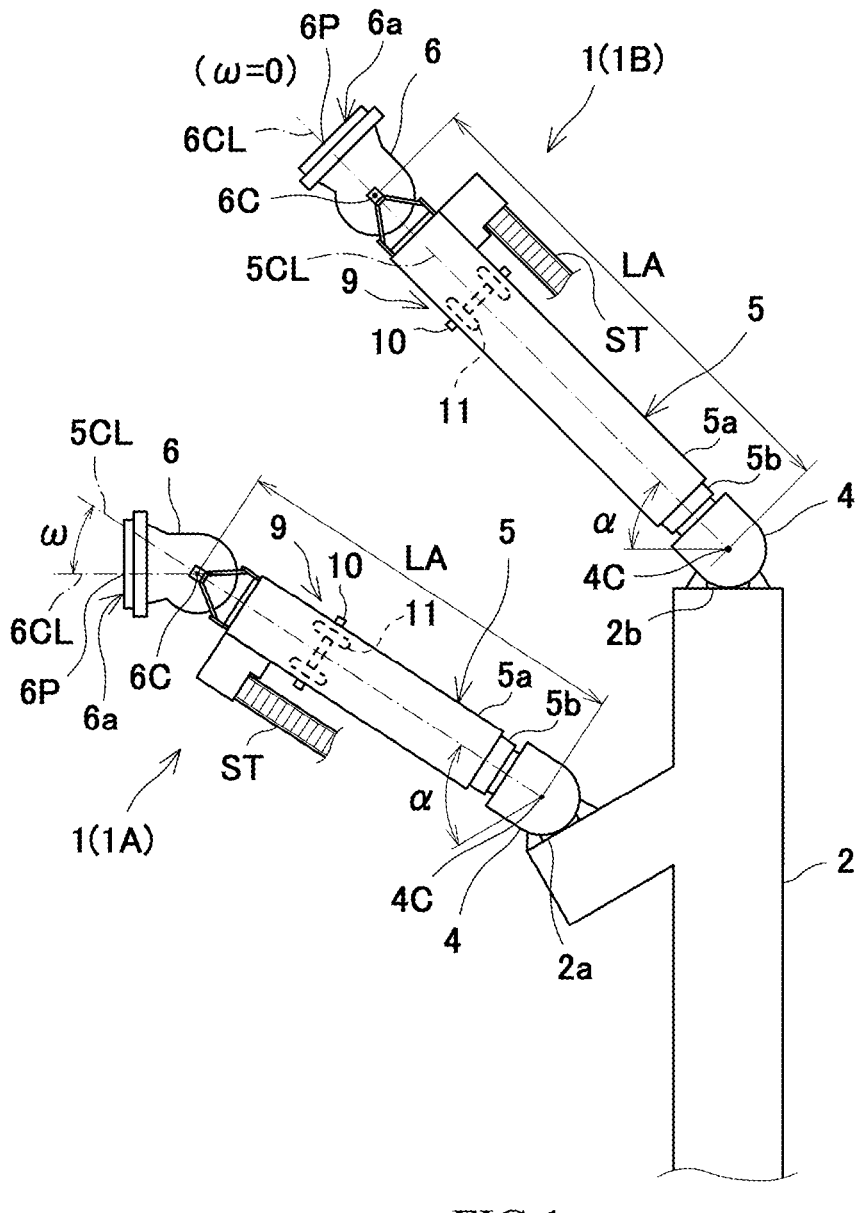
FIG. 1 is a schematic plan view showing one example of two boarding bridges that are operated by a boarding bridge remote operation system according to an embodiment of the present invention.

Hereinafter, preferred embodiments of the present invention are described with reference to the drawings. In the drawings, the same or corresponding elements are denoted by the same reference signs, and repeating the same descriptions is avoided below. The drawings show each component schematically in order to facilitate the understanding thereof. Therefore, in some cases, the drawings may not display accurate shapes, accurate dimensional ratios, etc. The present invention is not limited to the embodiments described below.

Embodiments

FIG. 1 is a schematic plan view showing one example of two boarding bridges that are operated by a boarding bridge remote operation system according to an embodiment of the present invention.

FIG. 1 shows two boarding bridges 1A and 1B, which are installed on two entrances 2a and 2b, respectively, of one gate 2 of a terminal building. A distal end part 6a of a cab 6 of each of the boarding bridges 1A and 1B is to be docked with an entrance (door) of an aircraft. It should be noted that the two boarding bridges 1A and 1B have fundamentally the same configuration. In the description herein, components of the boarding bridge 1A and components of the boarding bridge 1B corresponding thereto are denoted by the same reference signs. In a case where the boarding bridges 1A and 1B are not particularly differentiated from each other, each of the boarding bridges 1A and 1B is referred to as a boarding bridge 1.

Figure 2:
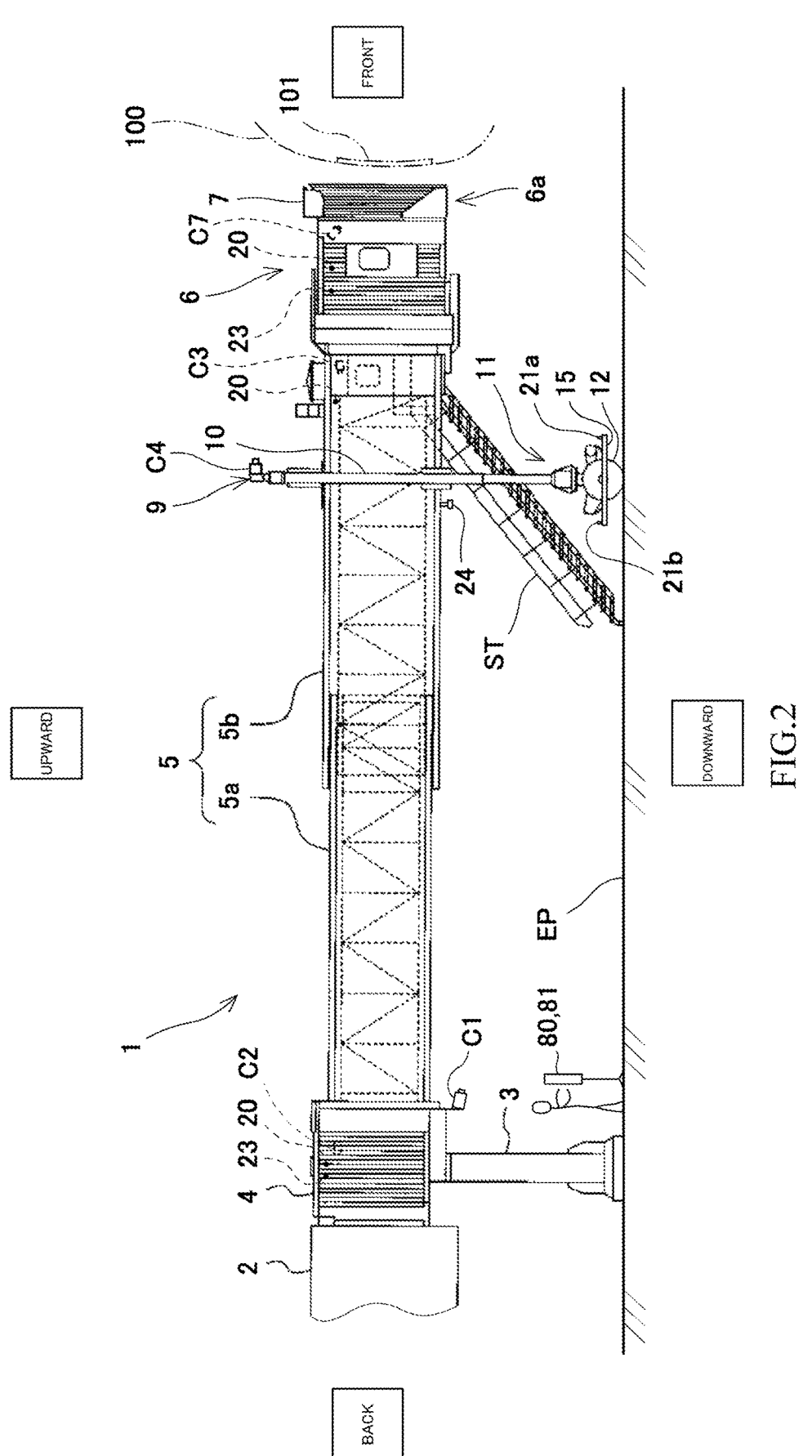
FIG. 2 is a schematic side view showing one example of a boarding bridge according to the present embodiment.

FIG. 2 is a schematic side view showing one example of the boarding bridge 1 according to the present embodiment. FIG. 2 shows the boarding bridge 1 in a state where the overall tunnel unit 5 is extended lengthwise.

Hereinafter, for the sake of convenience of the description, the direction in which the overall tunnel unit 5 of the boarding bridge 1 is extended and retracted lengthwise is referred to as the front-back direction; the direction in which the gravitational force is exerted on the boarding bridge 1 is referred to as the vertical direction; and the width direction of the boarding bridge 1 (i.e., the direction orthogonal to the front-back direction and the vertical direction) is referred to as the left-right direction. In addition, as shown in FIG. 2, the aircraft 100 side of the boarding bridge 1 is referred to as the "front" side, and the terminal building gate 2 side of the boarding bridge 1 is referred to as the "back" side in the description below.

Figure 3:
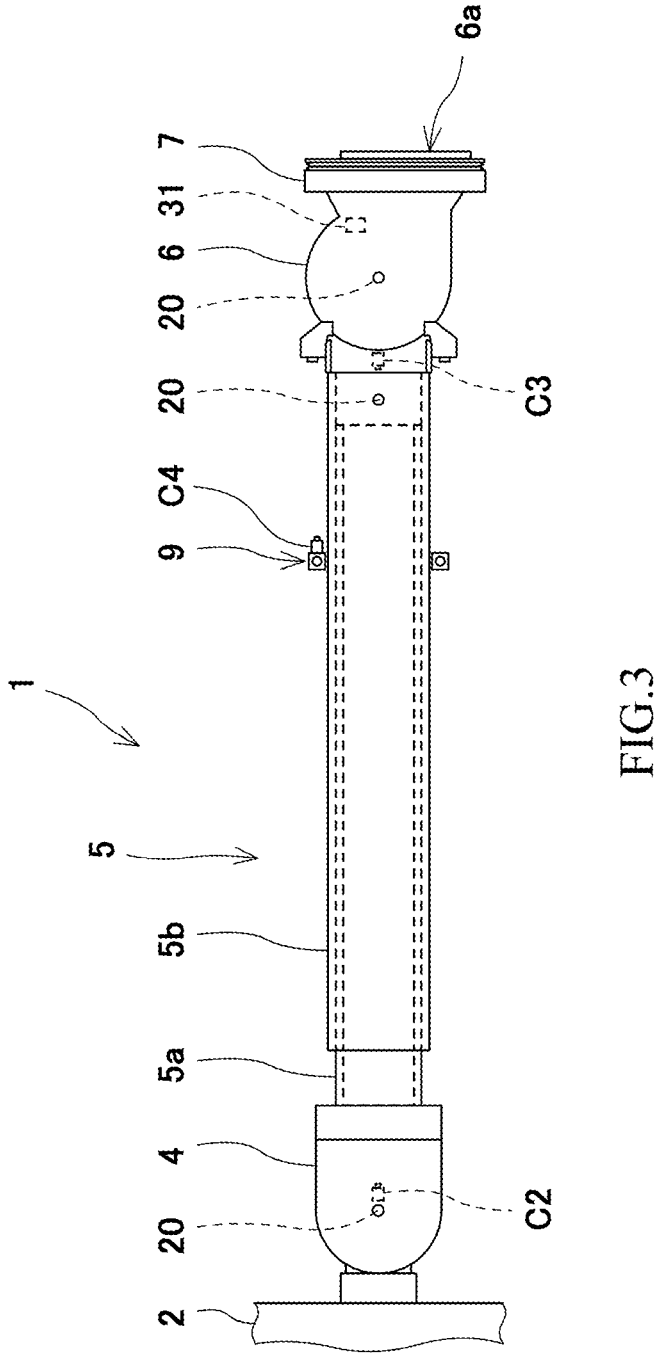
FIG. 3 is a schematic plan view of the boarding bridge as seen from above.
Figure 4:
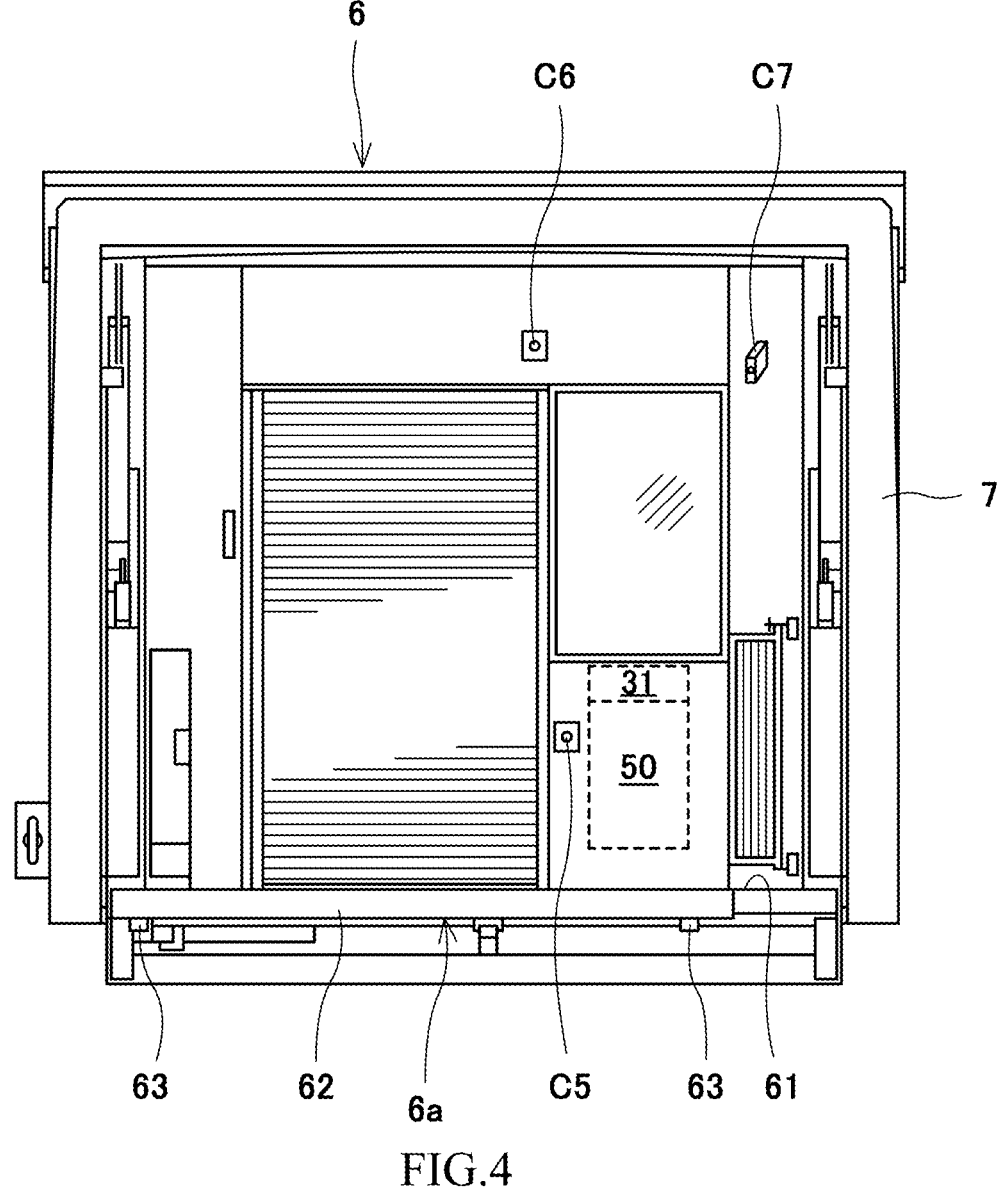
FIG. 4 is a view showing a cab distal end part to be docked with an aircraft, the view being taken from the aircraft side.

FIG. 3 is a schematic plan view of the boarding bridge 1 as seen from above. FIG. 3 shows a state where the overall tunnel unit 5 is retracted lengthwise. FIG. 4 is a front view of the distal end part of the cab 6 to be docked with an aircraft (the front view is taken from the aircraft side).

The boarding bridge 1 of the present embodiment includes: a rotunda (a back round room) 4 connected to the entrance (2a or 2b) of the terminal building gate 2; the tunnel unit 5 whose proximal end is connected to the rotunda 4, the tunnel unit 5 being swingable vertically such that the distal end of the tunnel unit 5 is liftable and lowerable; the cab (a front round room) 6 provided at the distal end of the tunnel unit 5; drive columns 9, which support the tunnel unit 5 at the distal side of the tunnel unit 5; and auxiliary stairs ST. The auxiliary stairs ST are provided on the side of the tunnel unit 5 in a manner to connect between the inside of the tunnel unit 5 and the ground of an apron EP. The auxiliary stairs ST are used to allow an operator or the like to get in and out of the cab 6.

The rotunda 4 is supported by a support pillar 3, such that the rotunda 4 is rotatable in regular and reverse directions about a predetermined rotational axis 4C (vertical axis).

The tunnel unit 5 forms a passenger walkway, and includes a plurality of tubular tunnels 5a and 5b, which are fitted together in a nested manner, such that the tunnel unit 5 is extendable and retractable in the longitudinal direction thereof. In the description herein, the tunnel unit 5 includes the two tunnels 5a and 5b as one example. The number of tunnels included in the tunnel unit 5 is not particularly limited, so long as the tunnel unit 5 includes two or more tunnels. The proximal end part of the tunnel unit 5 is connected to the rotunda 4 in such a manner that the tunnel unit 5 is liftable and lowerable (swingable vertically).

The distal-side portion of the tunnel unit 5 (specifically, the tunnel 5b, which is the frontmost tunnel) is provided with the drive columns 9, which serve as support legs. It should be noted that the drive columns 9 may be provided not on the tunnel 5b, but on the cab 6.

The drive columns 9 include a lifting/lowering device 10, which lifts and lowers the cab 6 and the tunnel unit 5. By lifting/lowering the tunnel unit 5 by the lifting/lowering device 10, the cab 6 and the tunnel unit 5 can be swung vertically with respect to the rotunda 4.

The drive columns 9 further include a travel device 11 provided under the lifting/lowering device 10, the travel device 11 including a pair of travel wheels 12, which are drivable to rotate independently of each other. The travel device 11 is configured to travel forward and backward by the rotation of the two travel wheels 12, and the travel direction of the travel device 11 is changeable. As a result of the travel device 11 (travel wheels 12) traveling on the ground of the apron EP, the tunnel unit 5 can be rotated about the rotunda 4, and the tunnel unit 5 can be extended/retracted.

The cab 6 is provided at the distal end of the tunnel unit 5. The cab 6 is configured to be rotatable, by a cab rotator 60 (see FIG. 5), in regular and reverse directions about a rotational axis 6C, which is perpendicular to the floor surface of the cab 6.

The cab 6 includes a passage that connects to the walkway of the tunnel unit 5, and a closure 7 is provided at the distal end part of the cab 6. The closure 7 includes a bellows portion that is expandable and contractible in the front-back direction. After docking the distal end part 6a of the cab 6 with an entrance 101 of an aircraft 100, by expanding the bellows portion forward, the front end of the bellows portion can be brought into contact with the aircraft 100 around the entrance 101 thereof.

As shown in FIG. 4, a bumper 62 is provided at the distal end of a floor 61 of the cab 6 to be docked with the aircraft 100. A plurality of (in this example, two) distance sensors 63 (e.g., laser distance meters), each of which measures the distance between the cab 6 and the aircraft 100, are mounted to the bumper 62, such that the distance sensors 63 are arranged in the left-right direction of the bumper 62. It should be noted that the installation positions of the distance sensors 63 are changeable as necessary. For example, the distance sensors 63 may be arranged on the floor 61 of the cab 6.

As shown in FIG. 4, cameras C5 and C6 (first image capturing equipment), each of which captures an image ahead of the distal end part 6a of the cab 6, are installed at respective positions that are recessed from the distal end part of the cab 6. These cameras C5 and C6 are provided for capturing images of the entrance 101 of the aircraft 100. The installation positions of the cameras C5 and C6 may be changed as necessary, so long as the cameras C5 and C6 are disposed away from each other and can each capture an image of the entrance 101 of the aircraft 100. Further, a camera C7 is installed on the upper portion of a side wall of the distal end part of the cab 6. The camera C7 is provided for capturing an image of a gap between the aircraft 100 and the distal end part 6a of the cab 6, for example, at the time of docking the distal end part 6a of the cab 6 with the aircraft 100.

As shown in FIG. 2 and FIG. 3, a plurality of motion sensors 20 and inside speakers 23 for announcement are installed inside the boarding bridge 1. Each of the motion sensors 20 is a sensor to detect a person present inside the boarding bridge 1. The inside speakers 23 for announcement are announcement equipment, and serve as one example of a notifier.

The motion sensors 20 are one example of inside monitoring equipment. Each of the motion sensors 20 is a sensor to detect a person present within a predetermined person detection area inside the boarding bridge 1. For example, the motion sensors 20 are installed on the ceilings of the rotunda 4, the tunnel 5b, and the cab 6. The installation locations of the motion sensors 20 and the number of motion sensors 20 to be installed may be changed as necessary.

As shown in FIG. 2, the inside speakers 23 are installed, for example, on the ceilings of the rotunda 4 and the cab 6. The inside speakers 23 are not particularly limited, so long as every person present in all the interior areas of the boarding bridge 1 can hear an announcement from any of the inside speakers 23. The installation locations of the inside speakers 23 and the number of inside speakers 23 to be installed may be changed as necessary.

Further, as one example of inside monitoring equipment, cameras C2 and C3 (second image capturing equipment), each of which is a camera to capture an image of the inside of the boarding bridge 1, are provided inside the boarding bridge 1. One camera C2 is installed near the ceiling of the rotunda 4, such that the camera C2 is directed from the rotunda 4 side toward the cab 6 side. The camera C2 can mainly capture an image of the inside of the tunnel unit 5. The other camera C3 is installed near the ceiling of the distal end side of the tunnel unit 5, such that the camera C3 is directed from the cab 6 side toward the rotunda 4 side. The camera C3 can mainly capture an image of the inside of the tunnel unit 5. It should be noted that the cameras serving as an example of inside monitoring equipment may include not only the cameras C2 and C3, but also another unshown camera that is installed either near the ceiling of the distal end side of the tunnel unit 5 or near the ceiling of the cab 6, is directed toward the inside of the cab 6, and can mainly capture an image of the inside of the cab 6.

Outside the boarding bridge 1, laser scanners 21 (21a and 21b), each of which is a sensor to detect a person present outside the boarding bridge 1, and an outside speaker 24 for announcement, which is announcement equipment serving as an outside notifier, are installed.

Each of the laser scanners 21a and 21b is intended for detecting a person present near the travel device 11. For example, a rectangular frame-shaped support member 15 is horizontally mounted to the travel device 11. The laser scanners 21a and 21b are installed on the support member 15 in the vicinity of respective corners thereof that face each other. Each of the laser scanners 21a and 21b has a detection angle range of 270 degrees. Around the entire surroundings of the travel device 11 in the horizontal direction, the presence of a person can be detected with the two laser scanners 21a and 21b. A detectable area is preset for each of the laser scanners 21a and 21b so that a person present within a certain distance from the travel device 11 can be detected.

The outside speaker 24 is installed, for example, on the travel device 11 of the drive columns 9 or on the bottom surface of the tunnel 5b near the travel device 11. The outside speaker 24 is not particularly limited, so long as every person present on the apron EP near the travel device 11 can hear an announcement from the outside speaker 24. The installation location of the outside speaker 24 and the number of outside speakers 24 to be installed may be changed as necessary.

Cameras C1 and C4 are provided outside the boarding bridge 1. The camera C1 (third image capturing equipment) is installed under the rotunda 4. The camera C1 is rotatable with respect to the rotunda 4 together with the rotunda 4 and the tunnel unit 5, and can always capture an image of the travel device 11 and an area therearound. There may be plural cameras C1, each of which always captures an image of the travel device 11 and the area therearound. The camera C4 is installed on the upper part of the drive columns 9, and can capture an image of the upper part of the cab 6 and the aircraft 100.

An operating panel 31 (FIG. 3, FIG. 4) including an operating device 32 and a display device 33 is installed in the cab 6 of the boarding bridge 1. The operating device 32 includes, for example, various operation switches and an operating lever. An operator can directly operate each boarding bridge 1 by using the various operation switches and the operating lever.

Figure 5:
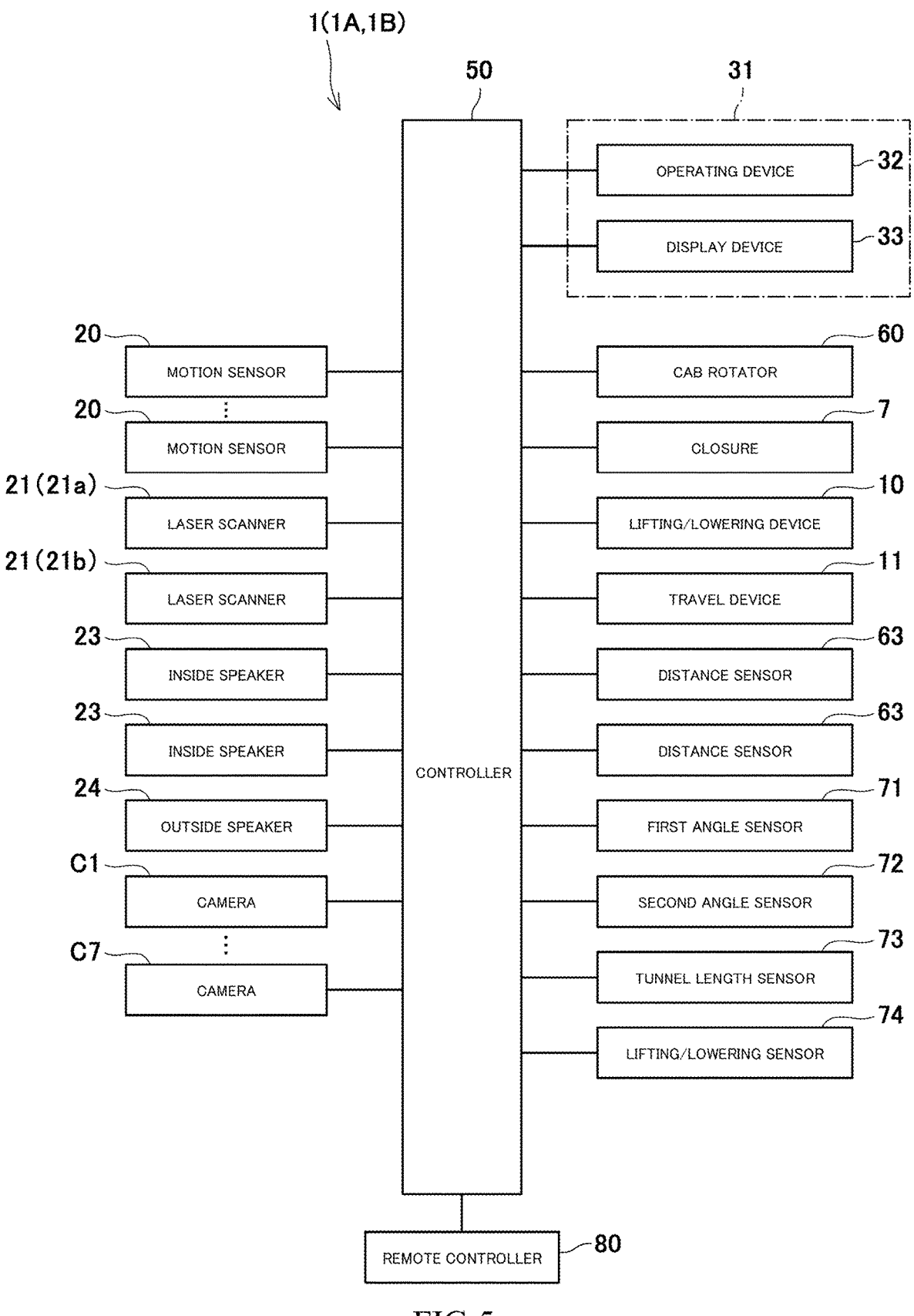
FIG. 5 is a block diagram schematically showing a connection relationship between a controller of the boarding bridge and each component of the boarding bridge.
Figure 6:
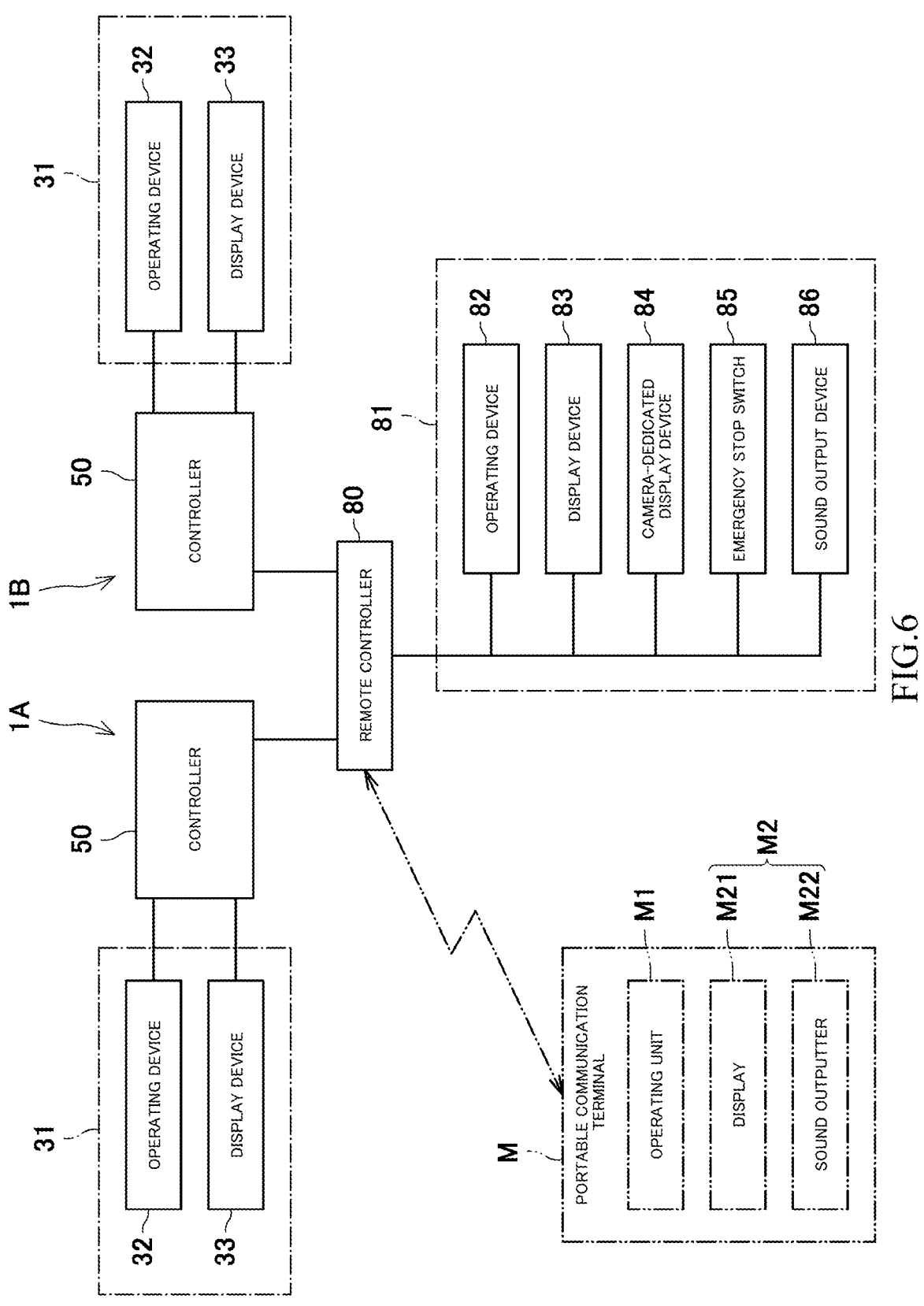
FIG. 6 is a block diagram showing one example of a remote operation system for performing remote operation of the two boarding bridges.

FIG. 5 is a block diagram schematically showing a connection relationship between a controller of the boarding bridge 1 and each component of the boarding bridge 1. FIG. 6 is a block diagram showing one example of a remote operation system for performing remote operation of the two boarding bridges 1.

Each boarding bridge 1 includes sensors such as: a first angle sensor 71, which detects a rotational angle $\alpha$ (FIG. 1) of the rotunda 4 and the tunnel unit 5; a second angle sensor 72, which detects a rotational angle @ (FIG. 1) of the cab 6; a tunnel length sensor 73; and a lifting/lowering sensor 74, which detects the amount of lifting/lowering by the lifting/lowering device 10. These sensors are arranged at suitable positions, respectively. The tunnel length sensor 73 is configured as, for example, a distance meter that measures the length of the tunnel unit 5. The tunnel length sensor 73 can calculate, based on its measurement value, a rotunda-to-cab center distance LA (FIG. 1), for example.

As shown in FIG. 1, in the boarding bridge 1 of this example, the rotunda 4 is configured to rotate together with the tunnel unit 5. Alternatively, the tunnel unit 5 may be configured to rotate with respect to the rotunda 4 about the rotational axis 4C in a state where the rotunda 4 is fixed. In either case of configuration, the tunnel unit 5 rotates about the rotational axis 4C, and the rotational angle $\alpha$ is an angle that a center line 5CL of each tunnel unit 5 forms relative to a parallel line along an end face of the entrance (2a or 2b) to which the corresponding rotunda 4 is connected. That is, the rotational angle $\alpha$ is considered as a rotational angle of each tunnel unit 5 about the predetermined rotational axis 4C passing through the corresponding rotunda 4.

In the boarding bridge 1 of this example, the entire cab 6 is configured to rotate with respect to the tunnel unit 5. Alternatively, only the distal end side of the cab 6, which is to be docked with the aircraft 100 and which includes the closure 7 and the distal end part 6a of the cab 6, may be configured to rotate about the rotational axis 6C. In either case of configuration, the rotational angle $\omega$ of each cab 6 is an angle that a straight line 6CL connecting between the rotational axis 6C of the cab 6 and a predetermined position 6P on the distal end part 6a of the cab 6 forms relative to the center line 5CL of the corresponding tunnel unit 5. That is, the rotational angle $\omega$ can be considered as a rotational angle of the distal end part 6a of the cab 6 about the predetermined rotational axis 6C passing through the cab 6.

A controller 50 is disposed, for example, in the cab 6 (illustratively shown in FIG. 4) or the frontmost tunnel 5b. The controller 50 may be configured in any manner, so long as the controller 50 has control functions. The controller 50 includes, for example, an arithmetic operation unit such as a CPU and a storage unit including a ROM, RAM, etc. A control program for operating the components of the boarding bridge 1 and information necessary for the operations of the components of the boarding bridge 1 are prestored in the storage unit. As a result of the arithmetic operation unit (CPU) executing the control program, the operations of the components of the boarding bridge 1, such as the cab rotator 60, the closure 7, the lifting/lowering device 10, and the travel device 11, can be controlled. Information to be stored while the boarding bridge 1 is operating is also stored in the storage unit. The controller 50 is configured such that a remote controller 80 (remote controller), which is an external device of the boarding bridge 1, and the controller 50 are communicable with each other. The communication between them may be wireless and/or wired communication, and a communication device for the communication may be installed separately. It should be noted that the controller 50 may be configured as a single control device performing centralized control, or may be configured as a plurality of control devices performing distributed control in cooperation with each other.

The controller 50 receives inputs of information (operation information) such as operation commands that are based on operations performed with the operating device 32. The controller 50 can control operations of the components of the boarding bridge 1 based on operations performed with the operating device 32. The controller 50 outputs, for example, information to be displayed by the display device 33.

The controller 50 receives inputs of output signals from the sensors 20, 63, 71 to 74, and the laser scanners 21. The controller 50 also receives inputs of image data of images captured by the cameras C1 to C7. The controller 50 can cause the display device 33 to display the images captured by the cameras C1 to C7. The controller 50 can also cause each of the inside speakers 23 and the outside speaker 24 to make a predetermined announcement (i.e., to perform a sound output) as necessary. The contents of the announcements are prestored in the storage unit as audio files corresponding thereto.

As shown in FIG. 6, the controllers 50 of the respective boarding bridges 1A and 1B installed on the same gate 2 are configured such that, as mentioned above, each controller 50 and the remote controller 80 are communicable with each other. The remote controller 80 is connected to remote equipment 81, and is communicable with the remote equipment 81. As shown in FIG. 2, the remote controller 80 and the remote equipment 81 are, for example, provided under the rotunda 4 of one of the boarding bridges 1 installed on the same gate 2.

The remote equipment 81 includes an operating device 82 (operating unit), a display device 83, a camera-dedicated display device 84, an emergency stop switch 85, and a sound output device 86 including a speaker or the like. The emergency stop switch 85 may be included in the operating device 82, or may be disposed at a location different from the remote equipment 81, for example, disposed on the support pillar 3 of the rotunda 4 or disposed in a gate-side building. The display device 83 may include a touch pad or a touch panel display, and functions of the operating device 82 may be partly or entirely integrated with the display device 83.

The remote controller 80 includes: a controller that receives inputs of signals from the operating device 82 and the emergency stop switch 85 and that controls the display device 83, the camera-dedicated display device 84, and the sound output device 86; and a communicator that performs communication between the controller and each controller 50.

The configuration of the operating device 82 is substantially the same as that of the operating device 32 of the boarding bridge 1. Accordingly, an operator can enter the cab 6 of the boarding bridge 1, and directly operate the boarding bridge 1 by using the operating device 32. Also, by using the operating device 82 of the remote equipment 81, the operator can select the boarding bridge 1 to be remotely operated, and perform remote operation of the selected boarding bridge 1. Then, in the case of manual control, the operator operates the operating device 32 or the operating device 82 to cause the components of the boarding bridge 1 to operate, thereby moving the boarding bridge 1 from a standby position to dock the boarding bridge 1 with the entrance 101 of the aircraft 100. Also, in the case of automatic control, by pressing an automatic docking start button included in the operating device 32 or 82, the operator can move the boarding bridge 1 from the standby position to dock the boarding bridge 1 with the entrance 101 of the aircraft 100. It should be noted that the standby position is a predetermined position where the boarding bridge 1 stands by until the aircraft 100 arrives at the apron. In the case of undocking the boarding bridge 1 from the entrance 101 of the aircraft 100, by pressing an automatic undocking start button included in the operating device 32 or 82, the operator can bring the boarding bridge 1 back to the predetermined standby position by automatic control.

The remote controller 80 and the controller 50 of the boarding bridge 1 to be remotely operated transmit to and receive from each other, for example, information necessary for the remote operation of the boarding bridge 1. For example, the remote controller 80 transmits, to the controller 50 of the boarding bridge 1 to be remotely operated, necessary operation information (e.g., an automatic docking start signal) from the operating device 82 for performing the remote operation of the boarding bridge 1. The controller 50 of the boarding bridge 1 to be remotely operated transmits, in real time, image data of images captured by the cameras C1 to C7 to the remote controller 80.

The camera-dedicated display device 84 obtains the image data of the images captured by the cameras C1 to C7 of the boarding bridge 1 to be remotely operated, and can display, in real time, the images captured by the cameras C1 to C7. The method of displaying the images is non-limiting. For example, images captured by multiple cameras may be displayed concurrently by splitting up a display screen into multiple display sections, or an image to be displayed may be switched from one image to another through camera selection.

The remote controller 80 can obtain, from the controller 50 of the boarding bridge 1 to be remotely operated, current positional information about a predetermined part of the boarding bridge 1 (e.g., the predetermined position 6P on the distal end part 6a of the cab 6, or the center position of the travel device 11), the predetermined part being displayed by the display device 33 of the boarding bridge 1, and can cause the display device 83 to display the obtained current positional information. The controller 50 of each boarding bridge 1 recognizes, in real time, the position of the predetermined part of the boarding bridge 1 (the position being expressed as three-dimensional position coordinates) by using, for example, a three-dimensional orthogonal coordinate system in which the intersection point of the rotational axis 4C of the rotunda 4 and the plane of the apron EP is set as an origin. The controller 50 is configured to calculate the position of the predetermined part of the boarding bridge 1 based on, for example, detection values of the first angle sensor 71, the second angle sensor 72, the tunnel length sensor 73, and the lifting/lowering sensor 74.

Next, one example of operations of the boarding bridge 1 is described. After the aircraft 100 has stopped targeting a predetermined stop position on the apron, at the time of performing docking of the boarding bridge 1 with the entrance 101 of the aircraft 100, for example, the cab 6 moves from the standby position to a temporary stop position, and then moves to a docking position at which the cab 6 gets docked with the entrance 101. When the cab 6 is undocked from the entrance 101, the cab 6 returns to and stops at the standby position, and then the cab 6 stands by at the standby position until the operation of docking the cab 6 with the entrance of the next aircraft starts. It should be noted that at the time of undocking the cab 6 from the aircraft 100 and returning the cab 6 to the standby position, a target position (target position coordinates) of the travel device 11 for the cab 6 to be at the standby position is prestored in the controller 50.

Next, steps to carry out in automatic control for performing remote operation of the boarding bridge 1, and steps to carry out in manual control for performing remote operation of the boarding bridge 1, are described.

[Automatic Control]

First, a case where the boarding bridge 1 is operated by automatic control is described. In a case where, by automatic control, the cab 6 is moved from the standby position and then the distal end part 6a of the cab 6 is docked with the entrance 101 of the aircraft 100, the controller 50, for example, captures images of the entrance 101 by the cameras C5 and C6 installed on the distal end part of the cab 6, recognizes the three-dimensional position of the entrance 101 from, for example, these captured images, calculates a position (docking position) at which the distal end part 6a of the cab 6 gets docked with the entrance 101, and controls the travel device 11, the lifting/lowering device 10, and the cab rotator 60 to move the distal end part 6a of the cab 6 to the docking position. Further, if necessary, detection values of the distance sensors 63 may be additionally used to recognize the position of the entrance 101.

Figure 7:
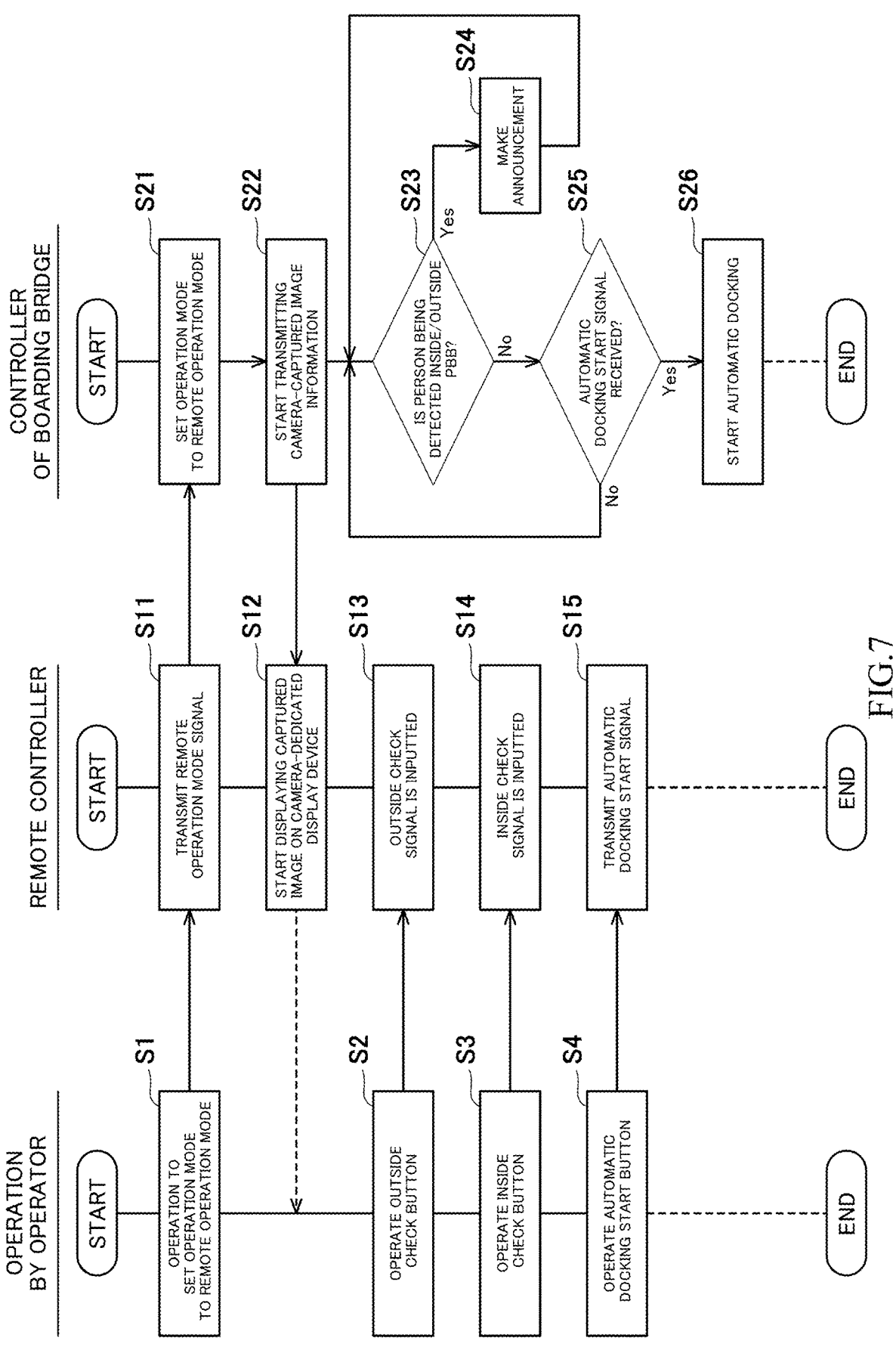
FIG. 7 is a flowchart schematically showing one example of operations performed in the remote operation system of the present embodiment at the time of docking the cab with the aircraft by automatic control.

FIG. 7 is a flowchart schematically showing one example of operations performed in the remote operation system of the present embodiment at the time of moving the cab 6 from the standby position and then docking the cab 6 with the aircraft 100 by automatic control.

FIG. 7 schematically shows one example of the following: steps in which an operator operates the operating device 82 of the remote equipment 81; steps in which the remote controller 80 operates; and steps in which the controller 50 of the boarding bridge 1 to be remotely operated operates. It should be noted that, for the motion sensors 20, their detection ranges can be set. The motion sensor 20 that is installed inside the rotunda 4 can detect a person entering the boarding bridge 1 from the gate 2 side. The motion sensor 20 that is installed at the distal side of the tunnel 5b of the tunnel unit 5 can detect, for example, a person entering the tunnel 5b from the auxiliary stairs ST. The motion sensor 20 that is installed inside the cab 6 is a sensor to detect a person present within a predetermined person detection area inside the cab 6. In this example, the detection range of the motion sensor 20 installed inside the cab 6 is set such that a predetermined area around the operating panel 31 is not included in the person detection area. For example, if a person is aboard the cab 6 of the boarding bridge 1, the door of the aircraft 100 can be opened immediately after the cab 6 is docked with the entrance 101 of the aircraft 100. Accordingly, the detection range is set such that when a person to open the door is present in the predetermined area around the operating panel 31, the person is not detected. It should be noted that in a case where the detection range is set such that the motion sensor 20 inside the cab 6 detects a person present around the operating panel 31 and a mat switch is placed in the predetermined area around the operating panel 31, if the motion sensor 20 inside the cab 6 and the mat switch both detect a person, it may be determined that no person is being detected in the person detection area.

First, in step S1, the operator operates the operating device 82 to perform an operation to set the operation mode of the boarding bridge 1 to a remote operation mode. At the time, in a case where a plurality of boarding bridges 1 are installed on the gate 2 as in this example, the operator selects the boarding bridge 1 to be remotely operated, and then performs the operation to set the operation mode to the remote operation mode. Here, in a case where the entrance 101 is the only entrance of the aircraft 100, the operator selects either one of the boarding bridges 1, whereas in a case where the aircraft 100 has two entrances 101, the operator may select two boarding bridges 1. It should be noted that there is a type of aircraft having three entrances 101, and there is a case where one gate is equipped with three boarding bridges 1 so as to accommodate for this type of aircraft. In such a case, the number of boarding bridges 1 to select may be decided in accordance with the number of entrances 101 of the arriving aircraft. There is also a case where one gate is equipped with only one boarding bridge 1. In such a case, the operator need not perform the operation to select the boarding bridge 1, but simply performs the operation to set the operation mode to the remote operation mode.

Operation modes of the boarding bridge 1 of this example include: a direct operation mode in which the operator operates the boarding bridge 1 by operating the operating device 32 of the boarding bridge 1; and the remote operation mode in which the operator operates the boarding bridge 1 by operating the operating device 82 of the remote equipment 81. A switch can be made between the remote operation mode and the direct operation mode by operating the operating device 32 of each boarding bridge 1 as well as by operating the operating device 82 of the remote equipment 81. For example, each of the operating devices 32 and 82 includes a mode setting button to set the operation mode to either the remote operation mode or the direct operation mode. The operation mode can be set to the remote operation mode by operating the mode setting button. The operating device 82 further includes a boarding bridge selection button to make a selection from the boarding bridges 1 (1A and 1B). Accordingly, at the time of setting the operation mode to the remote operation mode, either one of the boarding bridges 1 can be selected, or both of the boarding bridges 1 can be selected concurrently. Alternatively, in a case where the gate is equipped with, for example, three boarding bridges 1, any one of the boarding bridges can be selected, or two of or all three of the boarding bridges can be selected concurrently.

In step S1, the operator performs the operation to select the boarding bridge 1 to be remotely operated and the operation to set the operation mode to the remote operation mode, and in response, operation signals corresponding thereto are inputted to the remote controller 80. Upon receiving the inputs of the operation signals, the remote controller 80 transmits, in step S11, a remote operation mode signal to the controller 50 of the boarding bridge 1 to be remotely operated. Upon receiving the remote operation mode signal, the controller 50 sets the operation mode to the remote operation mode (step S21), and the controller 50 causes the display device 33 to display that the operation mode is the remote operation mode. Upon receiving the operation signals inputted by the operations performed in step S1, the remote controller 80 also causes the display device 83 to display a symbol, or a name, indicating the boarding bridge 1 to be remotely operated and to display that the operation mode is the remote operation mode.

When the operation mode is set to the remote operation mode in step S21, the controller 50 starts the motion sensors 20, the laser scanners 21, and the cameras C1 to C7. Then, the controller 50 obtains, from the cameras C1 to C7 in real time, image information of images captured by the cameras C1 to C7, and starts transmitting the obtained image information to the remote controller 80 (step S22). Upon receiving the image information, the remote controller 80 causes the camera-dedicated display device 84 to start displaying the received images captured by the cameras (step S12).

Next, the operator visually observes the travel device 11, and an area therearound, of the boarding bridge 1, and determines whether or not a person is present around the travel device 11. In a case where no person is present around the travel device 11, the operator presses an outside check button of the operating device 82 (step S2). Consequently, an outside check signal is inputted from the operating device 82 to the remote controller 80 (step S13). In the above step S2, the operator may determine whether or not a person is present around the travel device 11 by looking at an image of the travel device 11 and the area therearound, the image being captured by the camera C1, or may determine whether or not a person is present around the travel device 11 by visually observing the travel device 11 and the area therearound and looking at the image captured by the camera C1.

On the other hand, in a case where a person is present around the travel device 11, the operator presses an outside announcement button included in the operating device 82, the outside announcement button being a button to make an outside announcement of the start of the remote operation. Then, an operation signal corresponding thereto is transmitted from the remote controller 80 to the controller 50. Consequently, the controller 50 causes the outside speaker 24 to make an announcement notifying that, for example, the remote operation of the boarding bridge is going to start, thereby giving a warning or an evacuation advice in relation to the remote operation. It should be noted that the controller 50 or the remote controller 80 may be configured to have an image recognition function, and the controller 50 or the remote controller 80 may determine, based on image information from the camera C1, whether or not a person is present around the travel device 11 of the boarding bridge 1.

Further, the operator looks at images of the inside of the boarding bridge, the images being captured by the cameras C2 and C3 and displayed by the camera-dedicated display device 84, thereby determining whether or not a person is present inside the boarding bridge 1. In a case where no person is present inside the boarding bridge 1, the operator presses an inside check button of the operating device 82 (step S3). Consequently, an inside check signal is inputted from the operating device 82 to the remote controller 80 (step S14). On the other hand, in a case where a person is present inside the boarding bridge 1, the operator presses an inside announcement button included in the operating device 82, the inside announcement button being a button to make an inside announcement of the start of the remote operation. Then, an operation signal corresponding thereto is transmitted from the remote controller 80 to the controller 50. Consequently, the controller 50 causes the inside speakers 23 to make an announcement notifying that, for example, the remote operation of the boarding bridge is going to start, thereby giving a warning or an evacuation advice in relation to the remote operation. It should be noted that the controller 50 or the remote controller 80 may be configured to have an image recognition function, and the controller 50 or the remote controller 80 may determine, based on image information from the cameras C2 and C3, whether or not a person is present inside the boarding bridge 1.

Next, in step S4, the operator presses the automatic docking start button included in the operating device 82. An operation signal corresponding thereto is inputted to the remote controller 80, and in response thereto, the remote controller 80 transmits an automatic docking start signal to the controller 50 on condition that the inside check signal and the outside check signal have already been inputted to the remote controller 80 (step S15).

In step S21, the controller 50 of the boarding bridge 1 sets the operation mode to the remote operation mode, and starts the motion sensors 20 and the laser scanners 21. Then, results of detection performed by the motion sensors 20 and the laser scanners 21 are inputted to the controller 50 whenever the detection results are obtained, and the controller 50 determines whether or not a person is being detected inside the boarding bridge (PBB) based on the presence or absence of a detection signal input(s) from the motion sensors 20, and determines whether or not a person is being detected outside the boarding bridge (PBB) based on the presence or absence of a detection signal input(s) from the laser scanners 21 (step S23). In a case where the controller 50 receives a detection signal input(s) from the motion sensors 20 and determines that a person is being detected inside the boarding bridge (PBB), the controller 50 causes the inside speakers 23 to make an announcement notifying that, for example, the remote operation of the boarding bridge is going to start, and in a case where the controller 50 receives a detection signal input(s) from the laser scanners 21 and determines that a person is being detected outside the boarding bridge (PBB), the controller 50 causes the outside speaker 24 to make an announcement notifying that, for example, the remote operation of the boarding bridge is going to start (step S24).

When no person is being detected by the motion sensors 20 and the laser scanners 21 (No in step S23), if the controller 50 receives the automatic docking start signal from the remote controller 80 (Yes in step S25), the controller 50 starts automatic docking (an operation of docking the cab with the aircraft by automatic control) (step S26).

Then, after the automatic docking is started, if a person is detected by the motion sensors 20, the controller 50 temporarily stops the operation of the boarding bridge 1, and causes the inside speakers 23 to make an announcement notifying that, for example, the boarding bridge 1 is performing the remote operation. Then, when no person is detected by the motion sensors 20 anymore, the controller 50 resumes the operation of the boarding bridge 1. Also, if a person is detected by the laser scanners 21, the controller 50 temporarily stops the operation of the boarding bridge 1, and causes the outside speaker 24 to make an announcement notifying that, for example, the boarding bridge 1 is performing the remote operation. Then, when no person is detected by the laser scanners 21 anymore, the controller 50 resumes the operation of the boarding bridge 1.

After the automatic docking is started, if the operator presses the emergency stop switch 85, an emergency stop signal is transmitted from the remote controller 80 to the controller 50 of the boarding bridge 1. Upon receiving the emergency stop signal, the controller 50 stops the operation of the boarding bridge 1. Thus, in a case where any abnormality has occurred in, for example, the boarding bridge 1, the operator can stop the boarding bridge 1.

The controller 50 of the boarding bridge 1 is configured to detect, after the automatic docking is started, whether or not the communication between the controller 50 and the remote controller 80 is normal. If a communication abnormality is detected, the controller 50 stops the operation of the boarding bridge 1. For example, the remote controller 80 may be configured to transmit a signal for communication abnormality detection to the controller 50 every predetermined period, and the controller 50 may be configured to detect a communication abnormality when the signal for communication abnormality detection is not received every predetermined period anymore.

In a case where after automatic docking of a plurality of boarding bridges 1 is started concurrently, if an abnormality has occurred in one of the boarding bridges 1, and the controller 50 detects the abnormality and stops the one boarding bridge 1, the controller 50 transmits an abnormality stop signal to the remote controller 80. Upon receiving the abnormality stop signal, the remote controller 80 transmits an emergency stop signal to the controller(s) 50 of the other boarding bridge(s) 1 to be remotely operated, thereby stopping the operation of the other boarding bridge(s) 1 to be remotely operated. In this manner, the other boarding bridge(s) 1 can be prevented from coming too close to the boarding bridge 1 that has stopped due to the occurrence of the abnormality.

After the controller 50 of the boarding bridge 1 to be remotely operated has set the operation mode to the remote operation mode, the controller 50 may cause the display device 33 of the boarding bridge 1 to display the same image as that displayed by the display device 83 of the remote equipment 81. This makes it possible to let a person(s) present around the operating panel 31 of the boarding bridge 1 know that the remote operation is being performed. For example, if a person is aboard the cab 6 of the boarding bridge 1, the door of the aircraft 100 can be opened immediately after the cab 6 is docked with the entrance 101 of the aircraft 100.

While a person is, or persons are, being detected by the motion sensors 20 and/or the laser scanners 21, the controller 50 may transmit information about the detection, i.e., detection information, to the remote controller 80. In this case, based on the detection information, the remote controller 80 may cause the display device 83 and/or the sound output device 86 of the remote equipment 81 to notify the operator that a person is, or persons are, being detected inside and/or outside the boarding bridge.

In this example, the camera-dedicated display device 84 functions as an information outputter to output image information of images captured by, for example, the first to third image capturing equipment (the cameras C1, C2, C3, C5, and C6), the image information being inputted to the remote equipment 81. The display device 83 and/or the sound output device 86 may function as an information outputter to output results of detection performed by, for example, the motion sensors 20, the results of detection being inputted to the remote equipment 81.

It should be noted that the order of steps S2 and S3 in FIG. 7 may be reversed (the same applies to the order of steps S13 and S14).

[Manual Control]

Figure 8:
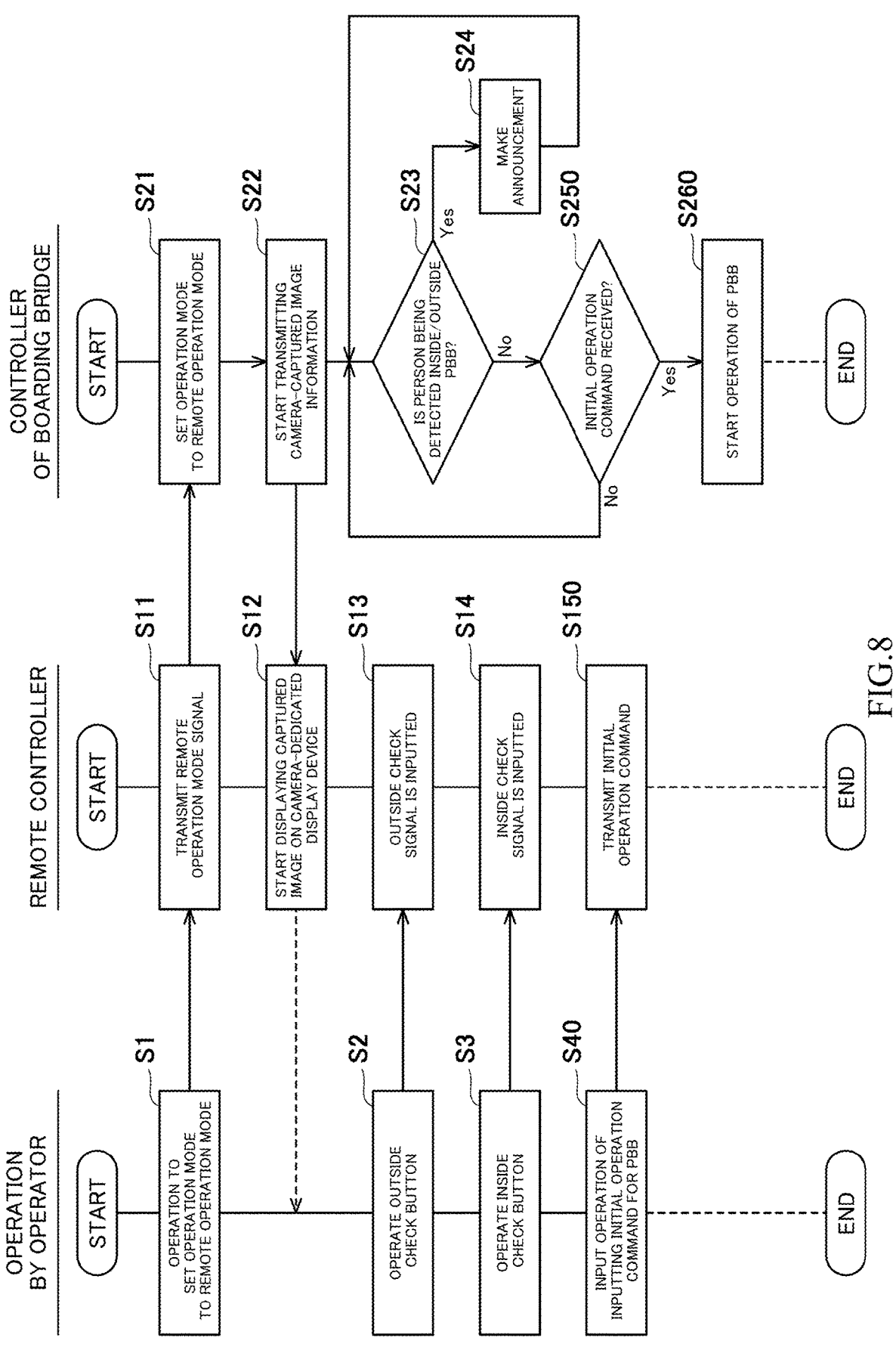
FIG. 8 is a flowchart schematically showing one example of operations performed in the remote operation system of the present embodiment at the time of docking the cab with the aircraft by manual control.

FIG. 8 is a flowchart schematically showing one example of operations performed in the remote operation system of the present embodiment at the time of moving the cab 6 from the standby position and then docking the cab 6 with the aircraft 100 by manual control. In FIG. 8, the same components as those shown in FIG. 7 are denoted by the same reference signs as those used in FIG. 7, and hereinafter, a description of differences from the automatic control described above with reference to FIG. 7 is given.

In the case of manual control, an operation of each of the cab rotator 60, the lifting/lowering device 10, and the travel device 11 of the boarding bridge 1 is individually controlled by using the operating device 82. For this reason, unlike the case of automatic control, a plurality of boarding bridges 1 cannot be selected to be remotely operated.

Accordingly, in step S1, the operator selects one boarding bridge 1 to be remotely operated, and performs an operation to set the operation mode to the remote operation mode.

Operations performed by the operator in steps S2 and S3, processes performed by the remote controller 80 in steps S11 to S14, and processes performed by the controller 50 of the boarding bridge 1 in steps S21 to S24 are the same as those in the case of the automatic control described above with reference to FIG. 7.

After the operator has pressed the outside check button and the inside check button in steps S2 and S3, the operator operates the operating device 82 in step S40 to perform an input operation of inputting an initial operation command for the boarding bridge 1. At the time, the operator operates the operating device 82 to operate any one of the cab rotator 60, the lifting/lowering device 10, and the travel device 11.

The remote controller 80 transmits the initial operation command based on the above input operation to the controller 50 on condition that the inside check signal and the outside check signal have already been inputted to the remote controller 80 (step S150).

Then, when no person is being detected by the motion sensors 20 and the laser scanners 21 (No in step S23), if the controller 50 of the boarding bridge 1 receives the initial operation command from the remote controller 80 (Yes in step S250), the controller 50 starts an operation of the boarding bridge 1 based on the initial operation command (step S260).

Also thereafter, the operator operates the operating device 82, and thereby an operation command for the boarding bridge 1 is transmitted from the remote controller 80 to the controller 50, and an operation of the boarding bridge 1 is performed based on the operation command. After the operation of the boarding bridge 1 is started, if a person is detected by the motion sensors 20, the controller 50 prohibits and temporarily stops the operation of the boarding bridge 1, and causes the inside speakers 23 to make an announcement notifying that, for example, the boarding bridge 1 is performing the remote operation, thereby giving a warning or an evacuation advice in relation to the remote operation. Then, when no person is detected by the motion sensors 20 anymore, the controller 50 allows resumption of the operation of the boarding bridge 1. Also, if a person is detected by the laser scanners 21, the controller 50 prohibits and temporarily stops the operation of the boarding bridge 1, and causes the outside speaker 24 to make an announcement notifying that, for example, the boarding bridge 1 is performing the remote operation, thereby giving a warning or an evacuation advice in relation to the remote operation. Then, when no person is detected by the laser scanners 21 anymore, the controller 50 allows resumption of the operation of the boarding bridge 1.

Also in FIG. 8, the order of steps S2 and S3 may be reversed (the same applies to the order of steps S13 and S14).

In the above-described case of manual control, the operator can perform the docking operation while looking at images of the entrance 101 of the aircraft 100, the entrance 101 being located forward of the cab 6, the images being captured by the cameras C5 and C6 on the cab 6 and displayed by the camera-dedicated display device 84.

Also, immediately before the cab 6 gets docked with the aircraft 100, the operator can perform the docking operation while looking at an image of a gap between the aircraft 100 and the distal end part 6a of the cab 6, the image being captured by the camera C7 and displayed by the camera-dedicated display device 84.

In this example, the remote equipment 81 is set under the rotunda 4. Therefore, when the operator remotely operates the boarding bridge 1, the operator can perform the remote operation in a state where the operator can visually observe (visually check directly) the situation outside the boarding bridge 1, such as the state of the travel device 11 and the area therearound. This makes it possible to check whether or not a person that may cause inconvenience for (i.e., that may interfere with) the operation of the boarding bridge 1 is present outside the boarding bridge 1, and thereby coordination with persons outside the boarding bridge 1 can be secured. Moreover, the operator can check whether or not a person is present inside the boarding bridge 1 by looking at images of the inside of the boarding bridge 1, the images being captured by the cameras C2 and C3 and displayed by the camera-dedicated display device 84 of the remote equipment 81, and thereby coordination with persons inside the boarding bridge 1 can be secured. This consequently makes it possible to perform the remote operation of the boarding bridge 1 in improved coordination with persons. Furthermore, image information of images captured by the cameras C5 and C6, the images each showing a part of the aircraft 100, the part being located forward of the cab 6, is outputted from the camera-dedicated display device 84. This allows the operator to perform the remote operation of the boarding bridge 1 while looking at the images of the entrance 101 of the aircraft 100. It should be noted that the remote equipment 81 may be suspended from the lower end of the rotunda 4.

There may be a case where before starting the docking operation of the boarding bridge 1, the controller 50 determines whether or not a person is being detected inside the boarding bridge 1 based on the presence or absence of a detection signal input(s) from the motion sensors 20, and determines whether or not a person is being detected outside the boarding bridge 1 based on the presence or absence of a detection signal input(s) from the laser scanners 21, and if a person is, or persons are, being detected inside and/or outside the boarding bridge 1, the controller 50 causes the speakers 23 and/or the speaker 24 to make an announcement, thereby giving a warning or an evacuation advice to the person(s), and thereafter, when no person is detected anymore both inside and outside the boarding bridge 1, the controller 50 starts the operation of the boarding bridge 1. In this manner, coordination with persons can be further improved.

Even after the docking operation of the boarding bridge 1 is started, a person or persons may still be detected inside and/or outside the boarding bridge 1 by the motion sensors 20 and/or the laser scanners 21. In this case, the controller 50 temporarily stops the operation of the boarding bridge 1, and causes the speakers 23 and/or the speaker 24 to make an announcement, thereby giving a warning or an evacuation advice to the person(s), and thereafter, when no person is detected anymore both inside and outside the boarding bridge 1, the controller 50 resumes the operation of the boarding bridge 1. In this manner, coordination with persons can be further improved.

The operator may be provided with their personal IC card, and the remote equipment 81 may include a card reader terminal. Operations with the operating device 82 of the remote equipment 81 may be enabled after information on the IC card is read out by the card reader terminal. In this manner, security can be improved.

The remote equipment 81 may include a key switch, and the operator may be lent a key. Operations with the operating device 82 may be enabled when the operator inserts the key into the key switch and rotates it. In this manner, security can be improved.

Instead of the remote equipment 81, a portable communication terminal M (see FIG. 6), such as a commercially available tablet or smartphone, may be used. In this case, a boarding bridge remote operation program (A) is preinstalled on the portable communication terminal M. The portable communication terminal M includes: an operating unit M1, with which to perform an input operation; and an information outputter M2 configured to output information. The information outputter M2 includes a display M21 and a sound outputter (a speaker) M22. Normally, the operating unit M1 and the display M21 may be configured as a touch panel display in which the operating unit M1 and the display M21 are integrated together.

The aforementioned boarding bridge remote operation program (A) is installed on the portable communication terminal M, and is a boarding bridge remote operation program for causing the portable communication terminal M to communicate with the remote controller (e.g., the remote controller 80). It is a remote operation program for causing the portable communication terminal M to perform an operation screen displaying process, an operation signal transmitting process, and an information outputting process, which are described hereinafter.

The operation screen displaying process is a process of causing the display M21 of the portable communication terminal M to display an operation screen with which to perform remote operation of a boarding bridge. The operation screen displaying process is performed, for example, when an operation of starting the remote operation program (A) is performed on the portable communication terminal M.

The operation signal transmitting process is a process of, when the operator has performed an input operation of inputting an operation command for the boarding bridge by operating the operating unit M1 on the operation screen displayed by the display M21, transmitting a signal corresponding to the input operation (an operation signal) to the remote controller 80.

The information outputting process is a process of causing the information outputter M2 to output the following information received from the remote controller 80: image information of images captured by the first image capturing equipment (the cameras C5 and C6); and monitoring information of monitoring by the inside monitoring equipment (image information of images captured by the second image capturing equipment, i.e., the cameras C2 and C3, and/or results of detection by the motion sensors 20). Through the information outputting process, the image information of the images captured by the cameras C5 and C6, and the image information of the images captured by the cameras C2 and C3, are outputted by displaying them on the display M21. Also, the results of the detection by the motion sensors 20 may be outputted by displaying them on the display M21, or may be outputted in the form of sound by the sound outputter M22.

In this example, the remote controller 80 is configured to transmit, to the portable communication terminal M, information received from the controller 50 of the boarding bridge to be remotely operated, such as image information of images captured by the cameras C1 to C7 and results of detection by the motion sensors 20.

The operation screen displayed on the display M21 of the portable communication terminal M displays, for example, various touch operation buttons such as: the automatic docking start button and the automatic undocking start button, each of which is a button to perform an input operation of inputting an operation command for a boarding bridge; the boarding bridge selection button to select a boarding bridge to be remotely operated; the mode setting button to set the operation mode to the remote operation mode; the outside check button; the inside check button; the outside announcement button; and the inside announcement button. By performing touch operations with these touch operation buttons, the same operations as those performed with the operating device 82 of the remote equipment 81 can be performed. The operation screen may further display an emergency stop touch operation button having the same function as that of the emergency stop switch 85. In order for the operator to perform manual control of the boarding bridge, the operation screen may display, for example, touch operation buttons to perform input operations of inputting operation commands for the cab rotator 60, the lifting/lowering device 10, and the travel device 11.

The processes that the remote operation program (A) causes the portable communication terminal M to perform may include, in addition to the above-described processes, a process of, when any of the touch operation buttons displayed on the operation screen, such as the boarding bridge selection button, the mode setting button to set the operation mode to the remote operation mode, the outside check button, the inside check button, the outside announcement button, or the inside announcement button, is touch-operated by the operator, transmitting a signal corresponding to the touch operation to the remote controller 80 (another operation signal transmitting process).

In the case of the above-described configuration, the remote controller 80 has an access point function, and when the operator operates the portable communication terminal M to start the remote operation program, communication between the portable communication terminal M and the remote controller 80 is enabled. Preferably, the remote controller 80 has a MAC address filtering function to prevent unauthorized access from unspecified mobile terminals. Preferably, at the time of concurrent access from a plurality of portable communication terminals M, the remote controller 80 has a function of autonomously assigning an order of priority so as not to allow the plurality of portable communication terminals M to concurrently operate the boarding bridge. In light of security, preferably, the portable communication terminal M has a biometric authentication function, such as a face authentication function or a fingerprint authentication function, and is configured such that only a registered operator can operate the portable communication terminal M.

Figure 9:
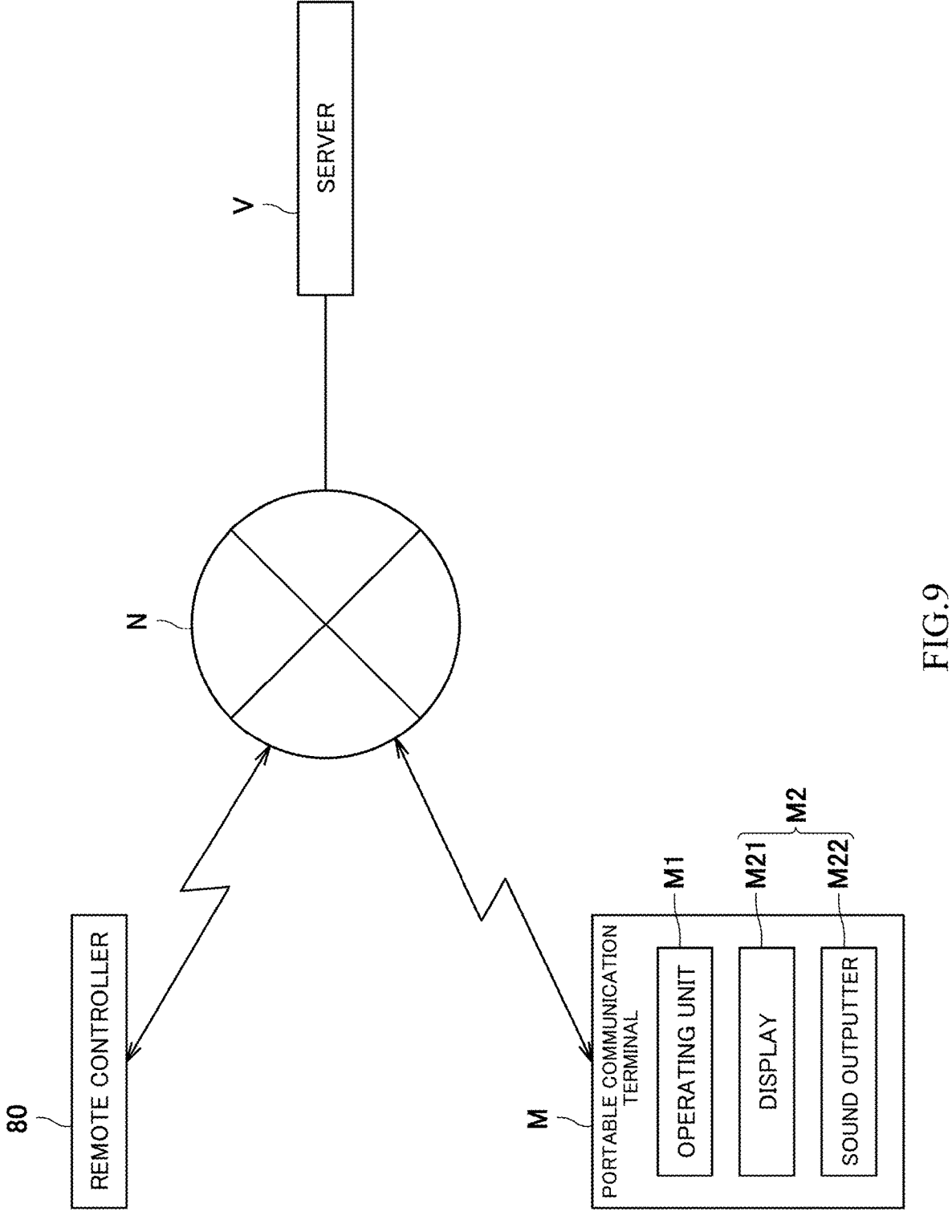
FIG. 9 is a block diagram showing essential components in a case where a portable communication terminal and a server for the remote operation system are used.

Instead of the remote equipment 81, the above-described portable communication terminal M and a server for the remote operation system (hereinafter, "the server V") may be used. FIG. 9 is a block diagram showing essential components in this case. In this case, the remote operation program (A) is not installed on the portable communication terminal M, but another program that is a boarding bridge remote operation program (B) is stored in the server V, and the remote operation program (B) is executed. The server V is a computer connected to an external communication network N, such as the Internet, and may be constituted by a plurality of computers, or may be a cloud server. Also, in this case, the remote controller 80 is configured such that the remote controller 80 and the server V are communicable with each other via, for example, the external communication network N. In a relationship between the server V and the portable communication terminal M, the server V functions as a web server, and the portable communication terminal M functions as a web browser.

The aforementioned boarding bridge remote operation program (B) is a boarding bridge remote operation program stored in the server V, which communicates with the portable communication terminal M and the remote controller (e.g., the remote controller 80) that performs remote control of a boarding bridge. It is a remote operation program for causing the server V to perform an operation screen transmitting process, an operation signal transferring process, and an information transmitting process, which are described hereinafter.

The operation screen transmitting process is a process of transmitting, to the portable communication terminal M, information for causing the portable communication terminal M to display, on the display M21, an operation screen with which to perform remote operation of a boarding bridge. The operation screen transmitting process is performed, for example, when the portable communication terminal M accesses a website that is intended for remote operation and that is provided by the server V. As a result of performing this process, the operation screen is displayed on the display M21 of the portable communication terminal M.

The operation signal transferring process is a process of, when the operator has performed an input operation of inputting an operation command for the boarding bridge by operating the operating unit M1 on the operation screen displayed by the display M21, receiving a signal corresponding to the input operation (an operation signal) from the portable communication terminal M and transmitting the received operation signal to the remote controller 80.

The information transmitting process is a process of transmitting, to the portable communication terminal M, the following information received from the remote controller 80: image information of images captured by the first image capturing equipment (the cameras C5 and C6); and monitoring information of monitoring by the inside monitoring equipment (image information of images captured by the second image capturing equipment, i.e., the cameras C2 and C3, and/or results of detection by the motion sensors 20). Through the information transmitting process, the image information of the images captured by the cameras C5 and C6, and the image information of the images captured by the cameras C2 and C3, are transmitted to the portable communication terminal M and outputted by displaying them on the display M21. Also, the results of the detection by the motion sensors 20 may be transmitted to the portable communication terminal M and outputted by displaying them on the display M21, or may be outputted in the form of sound by the sound outputter M22.

In this example, the remote controller 80 is configured to transmit, to the server V, information received from the controller 50 of the boarding bridge to be remotely operated, such as image information of images captured by the cameras C1 to C7 and results of detection by the motion sensors 20.

The operation screen displayed on the display M21 of the portable communication terminal M displays various touch operation buttons similar to those displayed on the operation screen in the above-described case where the remote operation program (A) is installed. By performing touch operations with these touch operation buttons, the same operations as those performed with the operating device 82 of the remote equipment 81 can be performed. The operation screen may further display an emergency stop touch operation button having the same function as that of the emergency stop switch 85. In order for the operator to perform manual control of the boarding bridge, the operation screen may display, for example, touch operation buttons to perform input operations of inputting operation commands for the cab rotator 60, the lifting/lowering device 10, and the travel device 11.

The processes that the remote operation program (B) causes the server V to perform may include, in addition to the above-described processes, a process of, when any of the touch operation buttons displayed on the operation screen, such as the boarding bridge selection button, the mode setting button to set the operation mode to the remote operation mode, the outside check button, the inside check button, the outside announcement button, or the inside announcement button, is touch-operated by the operator, receiving a signal corresponding to the touch operation and transmitting the received signal to the remote controller 80 (another operation signal transferring process).

Next, a boarding bridge remote operation program (C) is described. The remote operation program (C) is stored in the remote controller 80. In this case, the above-described portable communication terminal M is used instead of the remote equipment 81. It should be noted that the remote operation program (A) is not installed on the portable communication terminal M. In this case, the remote controller 80 is configured such that the remote controller 80 and the portable communication terminal M are communicable with each other via, for example, the external communication network N (see FIG. 9). That is, communication (transmission and reception of information and signals) between the remote controller 80 and the portable communication terminal M is performed via the external communication network N.

The boarding bridge remote operation program (C) is a boarding bridge remote operation program stored in the remote controller (e.g., the remote controller 80) that communicates with the portable communication terminal M and that performs remote control of a boarding bridge. It is a remote operation program for causing the remote controller 80 to perform an operation screen transmitting process, an operation signal receiving process, and an information transmitting process, which are described hereinafter.

The operation screen transmitting process is a process of transmitting, to the portable communication terminal M, information for causing the portable communication terminal M to display, on the display M21, an operation screen with which to perform remote operation of a boarding bridge. The operation screen transmitting process is performed, for example, when the portable communication terminal M accesses the remote controller 80. As a result of performing this process, the operation screen is displayed on the display M21 of the portable communication terminal M.

The operation signal receiving process is a process of, when the operator has performed an input operation of inputting an operation command for the boarding bridge by operating the operating unit M1 on the operation screen displayed by the display M21, receiving a signal corresponding to the input operation (an operation signal) from the portable communication terminal M. It should be noted that the remote controller 80 transmits the received operation signal to the controller 50 of the boarding bridge to be remotely operated.

The information transmitting process is a process of transmitting, to the portable communication terminal M, the following information: image information of images captured by the first image capturing equipment (the cameras C5 and C6); and monitoring information of monitoring by the inside monitoring equipment (image information of images captured by the second image capturing equipment, i.e., the cameras C2 and C3, and/or results of detection by the motion sensors 20). Through the information transmitting process, the image information of the images captured by the cameras C5 and C6, and the image information of the images captured by the cameras C2 and C3, are transmitted to the portable communication terminal M and outputted by displaying them on the display M21. Also, the results of the detection by the motion sensors 20 may be transmitted to the portable communication terminal M and outputted by displaying them on the display M21, or may be outputted in the form of sound by the sound outputter M22.

In this example, the remote controller 80 is configured to transmit, to the portable communication terminal M through the above-described information transmitting process or the like, information received from the controller 50 of the boarding bridge to be remotely operated, such as image information of images captured by the cameras C1 to C7 and results of detection by the motion sensors 20.

The operation screen displayed on the display M21 of the portable communication terminal M displays various touch operation buttons similar to those in the above-described cases of the remote operation programs (A) and (B). By performing touch operations with these touch operation buttons, the same operations as those performed with the operating device 82 of the remote equipment 81 can be performed. The operation screen may display the aforementioned emergency stop touch operation button, or may display, for example, the aforementioned touch operation buttons that are used when performing manual control.

The processes that the remote operation program (C) causes the remote controller 80 to perform may include, in addition to the above-described processes, a process of, when any of the touch operation buttons displayed on the operation screen, such as the boarding bridge selection button, the mode setting button to set the operation mode to the remote operation mode, the outside check button, the inside check button, the outside announcement button, or the inside announcement button, is touch-operated by the operator, receiving a signal corresponding to the touch operation (another operation signal receiving process).

Variations

Figure 10:
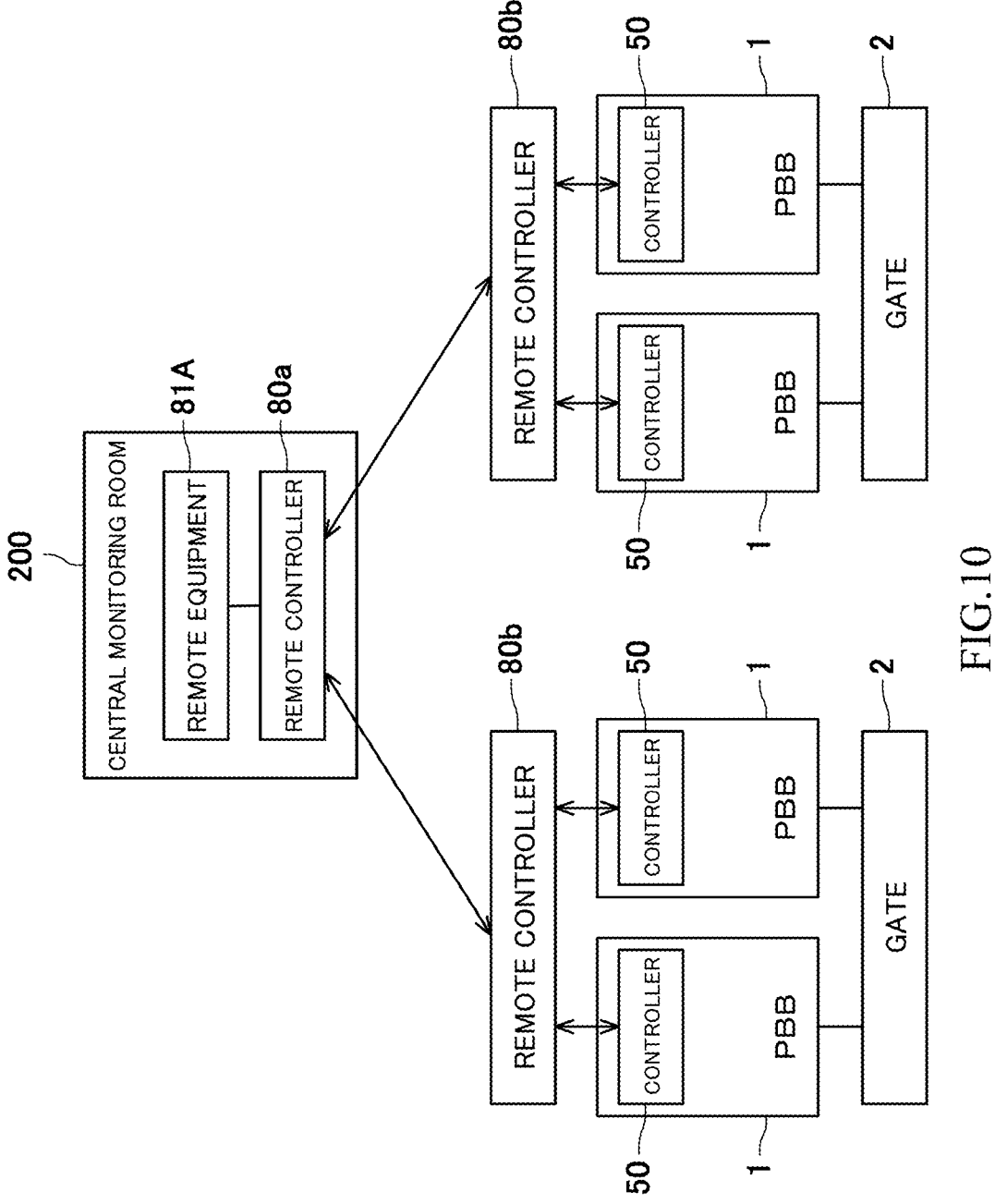
FIG. 10 is a block diagram showing one example of a case where remote equipment is installed in a central monitoring room.

In a variation herein, a case where the remote equipment is installed in a central monitoring room of the terminal building is described. FIG. 10 is a block diagram showing one example of the case where the remote equipment is installed in the central monitoring room.

In this example, the terminal building includes a plurality of gates 2, and a plurality of boarding bridges 1 are installed on each gate 2. Remote equipment 81A and a remote controller 80a connected to the remote equipment 81A are installed in a central monitoring room 200 of the terminal building.

The remote equipment 81A is configured such that the boarding bridges 1 installed on the plurality of gates 2 can be remotely operated with the remote equipment 81A. Similar to the above-described remote equipment 81, the remote equipment 81A includes the operating device 82, the display device 83, the camera-dedicated display device 84, the emergency stop switch 85, and the sound output device 86 (see FIG. 6). The operating device 82 of the remote equipment 81A is different from the operating device 82 of the above-described remote equipment 81 in that the operating device 82 of the remote equipment 81A is configured to select one of the gates 2.

The remote controller 80a of the central monitoring room 200, and remote controllers 80b corresponding to the respective gates 2, are configured to be communicable with each other. Each remote controller 80b is configured to be communicable with the controllers 50 of the respective boarding bridges 1 that are connected to the same gate 2. For each gate 2, functions of the remote controller 80 shown in FIG. 6 are realized by the remote controller 80a and the remote controller 80b. Communication between the remote controller 80a and the remote controller 80b may use an airport network, a local network, or the like.

In this variation, in step S1 of FIG. 7 in the case of automatic control, or in step S1 of FIG. 8 in the case of manual control, by operating the operating device 82 of the remote equipment 81A, the operator selects the gate 2 on which the boarding bridge 1 to be remotely operated is installed, then selects that boarding bridge 1 to be remotely operated, and performs an operation to set the operation mode to the remote operation mode.

Since the operator is in the central monitoring room 200, the operator cannot check by visual observation whether or not a person is present around the travel device 11 of the boarding bridge 1. Accordingly, in step S2 of FIG. 7 and FIG. 8, the operator determines whether or not a person is present around the travel device 11 by looking at an image of the travel device 11 and the area therearound, the image being captured by the camera C1 and displayed by the camera-dedicated display device 84. In a case where no person is present around the travel device 11, the operator presses the outside check button of the operating device 82. On the other hand, in a case where a person is present around the travel device 11, the operator presses the outside announcement button included in the operating device 82, the outside announcement button being a button to make an outside announcement of the start of the remote operation.

Except for the above-described points, the other features are the same as those in the above-described case described with reference to FIG. 7 and FIG. 8, i.e., the case of using the remote equipment 81 set under the rotunda 4.

In the above-described present embodiment, preferably, before the remote operation is started, the operator is monitoring, for example, the inside of the boarding bridge 1 by looking at camera-captured images that are displayed on the screen of the camera-dedicated display device 84. It should be noted that in the case of performing the remote operation from the central monitoring room 200, preferably, the operator is monitoring also the outside of the boarding bridge 1 by also looking at the image captured by the camera C1. Accordingly, in this case, for example, a biometric authenticator (a face authenticator or an iris authenticator) is provided. The biometric authenticator includes: a camera that is disposed, for example, near the display screen of the camera-dedicated display device 84 and that captures biometric information indicating a person's physical feature (e.g., captures an image of the face of the person or an image of the iris of an eyeball of the person); and a determiner that determines whether or not the biometric information captured by the camera coincides with pre-registered biometric information on the operator. Then, in each of the case of automatic control and the case of manual control, if the operator is authenticated by the biometric authenticator, the remote controller 80 or 80a may be allowed to transmit an operation command for the boarding bridge 1 (in the case of automatic control, an automatic docking start signal in step S15 of FIG. 7, whereas in the case of manual control, an initial operation command in step S150 of FIG. 8). On the other hand, if the operator is not authenticated by the biometric authenticator, the remote controller 80 or 80a may be prohibited from transmitting the operation command.

Instead of such a biometric authenticator, a face recognizer may be used. The face recognizer includes a camera that is disposed, for example, near the display screen of the camera-dedicated display device 84. In this case, if a person's face is recognized (detected) by the face recognizer, the remote controller 80 or 80a may be allowed to transmit an operation command for the boarding bridge 1, whereas if a person's face is not recognized by the face recognizer, the remote controller 80 or 80a may be prohibited from transmitting the operation command. In the case of adopting a face recognizer, the face recognizer cannot identify an individual whose face has been recognized. Therefore, in terms of security, the biometric authenticator is superior to the face recognizer.

In the case of manual control, preferably, also during the remote operation, the operator is monitoring, for example, ahead of the boarding bridge 1 and the inside of the boarding bridge 1 by looking at camera-captured images that are displayed on the screen of the camera-dedicated display device 84. It should be noted that in the case of performing the remote operation from the central monitoring room 200, preferably, the operator is monitoring also the outside of the boarding bridge 1 by also looking at the image captured by the camera C1. Accordingly, in the case of manual control, during the remote operation, if the operator is no longer authenticated by the above-described biometric authenticator, or if a person's face is no longer recognized by the above-described face recognizer, the remote controller 80 or 80*a* may be prohibited from transmitting an operation command for the boarding bridge 1 and the operation of the boarding bridge 1 may be temporarily stopped.

Also in the case of automatic control, preferably, during the remote operation, the operator is monitoring, for example, ahead of the boarding bridge 1 and the inside of the boarding bridge 1 by looking at camera-captured images that are displayed on the screen of the camera-dedicated display device 84 so that if, for example, some kind of abnormality has occurred during the remote operation, the operator can immediately address the abnormality (e.g., press the emergency stop switch 85). It should be noted that in the case of performing the remote operation from the central monitoring room 200, preferably, the operator is monitoring also the outside of the boarding bridge 1 by also looking at the image captured by the camera C1. Accordingly, in the case of automatic control, during the remote operation, if the operator is no longer authenticated by the above-described biometric authenticator, or if a person's face is no longer recognized by the above-described face recognizer, the remote controller 80 or 80*a* may transmit a temporary stop command for the boarding bridge 1, thereby temporarily stopping the operation of the boarding bridge 1.

It has been described above that the biometric authenticator or the face recognizer is used to detect that the operator is looking at camera-captured images displayed on the screen of the camera-dedicated display device 84. Alternatively, a human detection sensor, such as a mat switch, may be placed near the installation location of the remote equipment 81 or 81A, and the human detection sensor may be used to detect that the operator is present near the camera-dedicated display device 84. In this case, when no person is being detected by the human detection sensor, the boarding bridge 1 is prohibited from operating. That is, when no person is being detected by the human detection sensor, the remote controller 80 or 80*a* transmits no operation command for the boarding bridge 1. Further, during automatic control, when no person is detected by the human detection sensor anymore, the operation of the boarding bridge 1 may be temporarily stopped.

From the foregoing description, numerous modifications and other embodiments of the present invention are obvious to those skilled in the art. Accordingly, the foregoing description is to be construed as illustrative only, and is provided for the purpose of teaching those skilled in the art the best mode for carrying out the present invention. The structural and/or functional details may be substantially modified without departing from the scope of the present invention.

INDUSTRIAL APPLICABILITY

The present invention is useful, for example, as a boarding bridge remote operation system and a boarding bridge remote operation program that make it possible to perform remote operation of a boarding bridge in improved coordination with persons.

REFERENCE CHARACTER LIST 1 boarding bridge
2 terminal building gate
4 rotunda
5 tunnel unit
6 cab
10 lifting/lowering device
11 travel device
20 motion sensor
23 inside speaker
80 remote controller
81 remote equipment
82 operating device
83 display device
84 camera-dedicated display device
85 emergency stop switch
86 sound output device
C1 to C7 camera
M portable communication terminal
V server

The invention claimed is:

1. A boarding bridge remote operation system that is a remote operation system for performing remote operation of a boarding bridge, the boarding bridge including:
    a rotunda connected to a gate of a terminal building;
    a tunnel unit having a proximal end connected to the rotunda, the tunnel unit being configured to be extendable and retractable in a longitudinal direction of the tunnel unit;
    a cab provided at a distal end of the tunnel unit, the cab including a distal end part to be docked with an entrance of an aircraft;
    a lifting/lowering device that is mounted to the tunnel unit or the cab and that lifts and lowers the tunnel unit and the cab; and
    a pair of wheels that are mounted under the lifting/lowering device and that travel on a ground,
    the boarding bridge remote operation system comprising:
    at least one first camera that is provided on the cab and that captures an image of the entrance of the aircraft;
    inside monitoring equipment to monitor whether or not a person is present inside the boarding bridge;
    a remote controller provided corresponding to the gate and configured to be communicable with remote equipment that an operator operates while visually checking the pair of wheels and an area therearound, the remote equipment including an operating unit with which the operator performs an input operation of inputting an operation command for the boarding bridge and at least one of a display device or a first speaker configured to output information inputted thereto, wherein the remote controller gives an operation command corresponding to the input operation performed with the operating unit of the remote equipment to the boarding bridge to perform remote control of the boarding bridge, obtains image information of the image captured by the at least one first camera and monitoring information of monitoring by the inside monitoring equipment, and outputs the obtained image information and the obtained monitoring information to the remote equipment; and a second speaker that is provided inside the boarding bridge and that notifies a person inside the boarding bridge of information about the remote operation of the boarding bridge.

2. The boarding bridge remote operation system according to claim 1, wherein the inside monitoring equipment includes at least one second camera that captures an image of an inside of the boarding bridge, and image information of the image captured by the at least one second camera is the monitoring information.

3. The boarding bridge remote operation system according to claim 1, wherein the inside monitoring equipment includes a sensor to detect whether or not a person is present in a predetermined area inside the boarding bridge, and a result of detection by the sensor is the monitoring information.

4. The boarding bridge remote operation system according to claim 1, further comprising at least one third camera that captures an image of the pair of wheels and the area therearound, wherein the remote controller is configured to obtain image information of the image captured by the at least one third camera and to output the obtained image information to the remote equipment.

5. The boarding bridge remote operation system according to claim 4, wherein the gate of the terminal building comprises a plurality of gates, the operator operates the operating unit of the remote equipment to select one of the plurality of gates, and the remote controller corresponding to the selected gate and the remote equipment are configured to communicate with each other.

6. The boarding bridge remote operation system according to claim 1, wherein the remote equipment is disposed under the rotunda.

7. The boarding bridge remote operation system according to claim 1, further comprising an emergency stop switch disposed under the rotunda, the emergency stop switch being a switch to bring the boarding bridge to an emergency stop when the boarding bridge is operating.

8. The boarding bridge remote operation system according to claim 1, wherein the remote equipment is a portable communication terminal.

9. A boarding bridge remote operation system that is a remote operation system for performing remote operation of a boarding bridge, the boarding bridge including:

a rotunda connected to a gate of a terminal building;

a tunnel unit having a proximal end connected to the rotunda, the tunnel unit being configured to be extendable and retractable in a longitudinal direction of the tunnel unit;

a cab provided at a distal end of the tunnel unit, the cab including a distal end part to be docked with an entrance of an aircraft;

a lifting/lowering device that is mounted to the tunnel unit or the cab and that lifts and lowers the tunnel unit and the cab; and a pair of wheels that are mounted under the lifting/lowering device and that travel on a ground, the boarding bridge remote operation system comprising:

at least one first camera that is provided on the cab and that captures an image of the entrance of the aircraft;

inside monitoring equipment to monitor whether or not a person is inside the boarding bridge; and a remote controller provided corresponding to the gate and configured to be communicable with remote equipment, the remote equipment including an operating unit with which an operator performs an input operation of inputting an operation command for the boarding bridge and at least one of a display device or a speaker configured to output information inputted thereto, wherein the remote controller gives an operation command corresponding to the input operation performed with the operating unit of the remote equipment to the boarding bridge to perform remote control of the boarding bridge, obtains image information of the image captured by the at least one first camera and monitoring information of monitoring by the inside monitoring equipment, and outputs the obtained image information and the obtained monitoring information to the remote equipment, wherein the boarding bridge is configured to be allowed to start operating after the operator has performed, with the operating unit of the remote equipment, a check operation indicating confirmation by the operator that no person is present at or around the pair of wheels and that no person is present inside the boarding bridge.

10. The boarding bridge remote operation system according to claim 9, wherein the inside monitoring equipment includes at least one second camera that captures an image of an inside of the boarding bridge, and image information of the image captured by the at least one second camera is the monitoring information.

11. The boarding bridge remote operation system according to claim 9, wherein the inside monitoring equipment includes a sensor to detect whether or not a person is present in a predetermined area inside the boarding bridge, and a result of detection by the sensor is the monitoring information.

12. The boarding bridge remote operation system according to claim 9, further comprising at least one third camera that captures an image of the pair of wheels and an area therearound, wherein the remote controller is configured to obtain image information of the image captured by the at least one third camera and to output the obtained image information to the remote equipment.

13. The boarding bridge remote operation system according to claim 12, wherein the gate of the terminal building comprises a plurality of gates, the operator operates the operating unit of the remote equipment to select one of the plurality of gates, and the remote controller corresponding to the selected gate and the remote equipment are configured to communicate with each other.

14. The boarding bridge remote operation system according to claim 9, wherein the remote equipment is disposed under the rotunda.

15. The boarding bridge remote operation system according to claim 9, further comprising an emergency stop switch disposed under the rotunda, the emergency stop switch being a switch to bring the boarding bridge to an emergency stop when the boarding bridge is operating.

16. The boarding bridge remote operation system according to claim 9, wherein the remote equipment is a portable communication terminal.

* * * * *